United States Patent
Lee et al.

(10) Patent No.: US 9,696,583 B2
(45) Date of Patent: Jul. 4, 2017

(54) SWITCHABLE TYPE DISPLAY DEVICE AND METHOD OF DRIVING THE SAME

(71) Applicant: LG Display Co., Ltd., Seoul (KR)

(72) Inventors: Young-Bok Lee, Goyang-si (KR); Kyeong-Jin Kim, Goyang-si (KR); Hoon Kang, Goyang-si (KR); Ji-Na Jeon, Paju-si (KR); Hong-Yun Kang, Incheon (KR)

(73) Assignee: LG Display Co., Ltd., Seoul (KR)

( * ) Notice: Subject to any disclaimer, the term of this patent is extended or adjusted under 35 U.S.C. 154(b) by 29 days.

(21) Appl. No.: 14/581,597

(22) Filed: Dec. 23, 2014

(65) Prior Publication Data

US 2015/0185487 A1    Jul. 2, 2015

(30) Foreign Application Priority Data

Dec. 27, 2013  (KR) .................. 10-2013-0166086
Dec. 9, 2014   (KR) .................. 10-2014-0175760

(51) Int. Cl.
| | | |
|---|---|---|
| *G02F 1/13* | (2006.01) | |
| *G02F 1/1335* | (2006.01) | |
| *G02B 3/14* | (2006.01) | |
| *G02B 27/22* | (2006.01) | |
| *G02F 1/29* | (2006.01) | |

(52) U.S. Cl.
CPC ............. *G02F 1/1336* (2013.01); *G02B 3/14* (2013.01); *G02B 27/2214* (2013.01); *G02F 2001/294* (2013.01)

(58) Field of Classification Search
CPC ...... G02B 27/22; G02B 27/2214; G02B 3/14; G02F 1/137; G02F 1/1334; G02F 1/13439; G02F 1/134309; G02F 1/1336; G02F 2001/294
See application file for complete search history.

(56) References Cited

U.S. PATENT DOCUMENTS

| | | | |
|---|---|---|---|
| 7,327,434 B1 * | 2/2008 | Ren ................. | G02B 3/0087 349/200 |
| 8,553,197 B2 * | 10/2013 | Galstian ............. | G02B 3/14 349/200 |
| 2007/0296896 A1 | 12/2007 | Hong et al. | |
| 2012/0092586 A1 * | 4/2012 | He .................. | G02B 27/2214 349/61 |
| 2013/0235287 A1 * | 9/2013 | Im .................. | G02B 27/2214 349/15 |
| 2014/0152925 A1 * | 6/2014 | Wu .................. | G02B 27/2214 349/15 |

FOREIGN PATENT DOCUMENTS

| | | |
|---|---|---|
| CN | 101968595 A | 2/2011 |
| KR | 10-2008-0105572 A | 12/2008 |
| KR | 10-2011-0095634 A | 8/2011 |

* cited by examiner

*Primary Examiner* — Charles Chang
(74) *Attorney, Agent, or Firm* — Fenwick & West LLP

(57) ABSTRACT

A switchable type display device includes: a display panel displaying an image; and a lens panel refracting or transmitting a light emitted from the display panel, the lens panel comprising: first and second substrates facing and spaced apart from each other; first and second electrodes on an inner surface of at least one of the first and second substrates; a lens layer between the first and second substrates; and a liquid crystal layer between the lens layer and one of the first and second substrates, the liquid crystal layer including a nano liquid crystal having a nano capsule filled with a plurality of liquid crystal molecules.

17 Claims, 10 Drawing Sheets

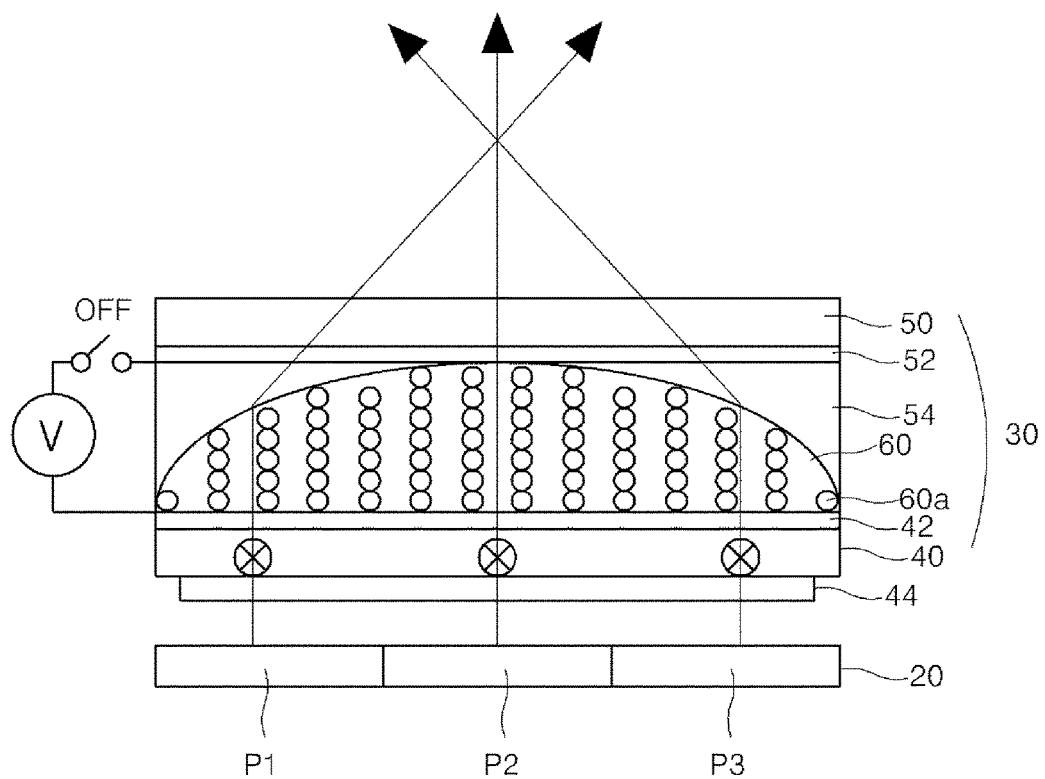

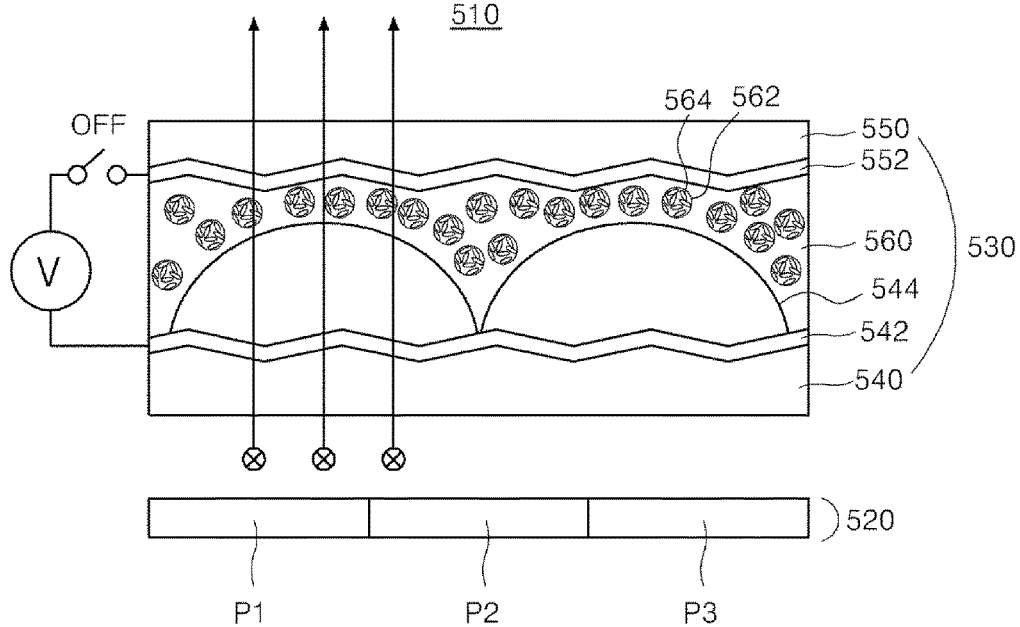
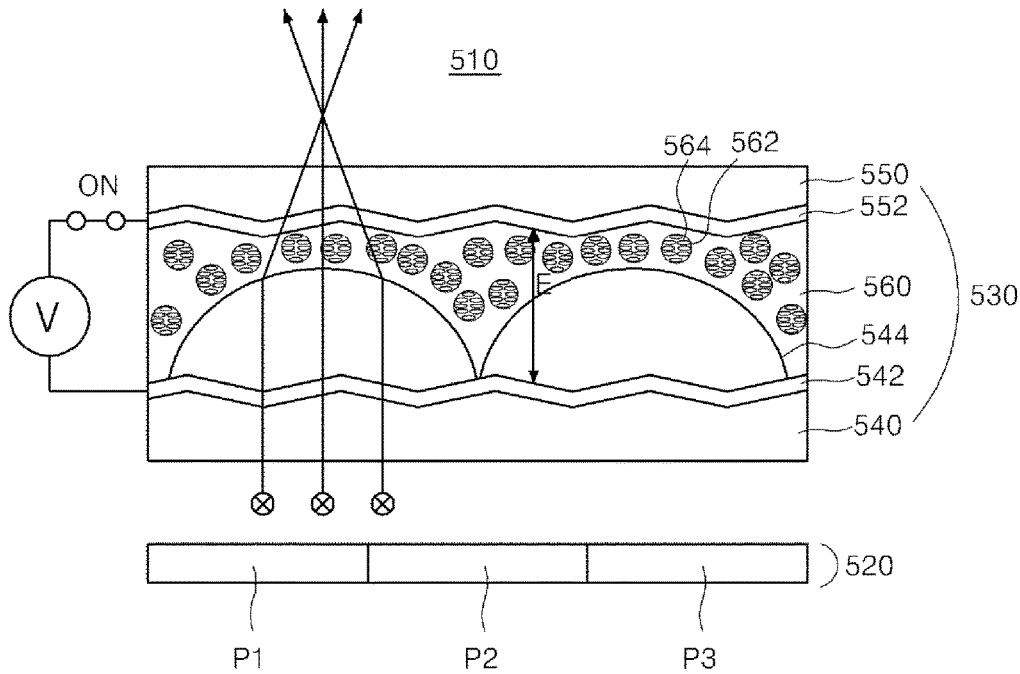

SWITCHABLE TYPE DISPLAY DEVICE AND METHOD OF DRIVING THE SAME

CROSS-REFERENCE TO RELATED APPLICATION

This application claims the benefit under 35 U.S.C. §119 (a) of Korean Patent Application No. 10-2013-0166086, filed on Dec. 27, 2013 and Korean Patent Application No. 10-2014-0175760, filed on Dec. 9, 2014, in the Korean Intellectual Property Office, each of which are incorporated herein by reference in their entirety.

BACKGROUND

1. Technical Field

The present disclosure relates to a switchable type display device, and more particularly, to a display device switchable between a 2D image and a 3D image including a film type lens panel using a nano liquid crystal.

2. Discussion of the Related Art

Recently, a switchable type display device which selectively displays a two-dimensional (2D) image or a three-dimensional (3D) image has been suggested. In the switchable type display device, a liquid crystal layer between a concave lens layer and a substrate selectively functions as a lens according to application of an electric field using an optical anisotropy of a liquid crystal molecule.

FIGS. 1A and 1B are cross-sectional views showing a light path of a switchable type display device in a 2D mode and a 3D mode, respectively, according to the related art.

In FIGS. 1A and 1B, a switchable type display device 10 includes a display panel 20 and a lens panel 30. The display panel 20 displays an image using a plurality of pixels including first to third pixels P1 to P3. The light emitted from the display panel 20 may have a polarized state along a predetermined direction while passing through a polarizing plate 44. For example, the light may have a polarized state of a direction perpendicular to a cross-sectional surface.

The lens panel 30 is disposed over the display panel 20 and selectively refracts or transmits a light emitted from the display panel 20. The lens panel 30 includes first and second substrates 40 and 50 facing and spaced apart from each other and a liquid crystal layer 60 between the first and second substrates 40 and 50. First and second electrodes 42 and 52 are formed on inner surfaces of the first and second substrates 40 and 50, respectively. In addition, a transparent concave lens layer 54 is formed on the second electrode 52.

The concave lens layer 54 has a plurality of concave portions on a bottom surface thereof and each of the plurality of concave portions has a half-cylindrical shape. The liquid crystal layer 60 is disposed in the plurality of concave portions between the concave lens layer 54 and the first electrode 42.

The liquid crystal layer 60 includes a plurality of liquid crystal molecules 60a and each of the plurality of liquid crystal molecules 60a has a birefringence property which shows an ordinary refractive index ($n_o$) or an extraordinary refractive index ($n_e$) according to a direction of a light. In the liquid crystal layer 60, the plurality of liquid crystal molecules 60a may be horizontally aligned such that a long axis of the liquid crystal molecule 60a is perpendicular to the cross-sectional surface. In addition, the concave lens layer 54 may include a material having a refractive index the same as the ordinary refractive index ($n_o$) of each liquid crystal molecule 60a.

The switchable type display device 10 selectively displays a 2D image or a 3D image according to an alignment state of the liquid crystal layer 60. In a 2D mode where a 2D image is displayed, as shown in FIG. 1A, a voltage is applied to the first and second electrodes 42 and 52 (ON) and an electric field is generated between the first and second electrodes 42 and 52. As a result, the liquid crystal layer 60 is re-aligned such that a long axis of the liquid crystal molecule 60a is parallel to the direction of the electric field.

The light that have passed through the polarizing plate 44 has a polarized state of a direction perpendicular to the cross-sectional surface and parallel to a short axis of the liquid crystal molecule 60a and is applied to the liquid crystal layer 60 having the ordinary refractive index ($n_o$). As a result, the light is not subject to a difference in refractive index at an interface between the liquid crystal layer 60 having the ordinary refractive index ($n_o$) and the concave lens layer 54 having the ordinary refractive index ($n_o$). Therefore, the light having the polarized state of a direction perpendicular to the cross-sectional surface intactly passes through the lens panel 30 without refraction and the switchable type display device 10 displays a 2D image.

In a 3D mode where a 3D image is displayed, as shown in FIG. 1B, a voltage is not applied to the first and second electrodes 42 and 52 (OFF) and an electric field is not generated between the first and second electrodes 42 and 52. As a result, the liquid crystal layer 60 keeps the initial alignment state where a long axis of the liquid crystal molecule 60a is perpendicular to the cross-sectional surface.

The light that have passed through the polarizing plate 44 has a polarized state of a direction perpendicular to the cross-sectional surface and parallel to a long axis of the liquid crystal molecule 60a and feels that the liquid crystal layer 60 has the extraordinary refractive index ($n_e$). As a result, the light is subject to a difference in refractive index at an interface between the liquid crystal layer 60 having the extraordinary refractive index ($n_e$) and the concave lens layer 54 having the ordinary refractive index ($n_o$). Therefore, the light having the polarized state of a direction perpendicular to the cross-sectional surface is refracted while passing through the lens panel 30 and the switchable type display device 10 displays a 3D image.

In the switchable type display device 10 according to the related art, since the liquid crystal layer 60 is formed by filling a space between the first and second substrates 40 and 50 with the liquid crystal molecules 60a of a fluid state, a thickness of the switchable type display device 10 increases and there is a limitation to fabricate the lens panel 30 as a film type. Accordingly, fabrication cost of the switchable type display device 10 increases. In addition, since the liquid crystal molecules 60a of the liquid crystal layer 60 sags and a cell gap is not kept uniformly due to gravitation even after the lens panel 30 is fabricated, a switchable property between the 2D image and the 3D image is deteriorated.

SUMMARY

Embodiments of the present disclosure relate to a switchable type display device and a method of driving the switchable type display device. Accordingly, one exemplary embodiment is directed to a switchable type display device that substantially obviates one or more of the problems due to limitations and disadvantages of the related art.

One exemplary embodiment is a switchable display device where a thickness decreases and fabrication cost is reduced by forming a lens panel of a film type using a nano liquid crystal where a polymer nano capsule is filled with liquid crystal molecules, and a method of driving the switchable type display device.

In addition, one exemplary embodiment is a switchable display device where a sagging of a liquid crystal layer is prevented and a switchable property between a 2D image and a 3D image is improved with a uniform cell gap by forming the liquid crystal layer of a lens panel using a nano liquid crystal where a polymer nano capsule is filled with liquid crystal molecules, and a method of driving the switchable type display device.

Advantages and features of the disclosure will be set forth in part in the description, which follows and in part will become apparent to those having ordinary skill in the art upon examination of the following or may be learned from practice of the invention. Other advantages and features of the embodiments herein may be realized and attained by the structure particularly pointed out in the written description and claims hereof as well as the appended drawings.

To achieve other advantages and features in accordance with the purpose according to one aspect of the invention, one exemplary embodiment is a switchable type display device including: a display panel displaying an image; and a lens panel refracting or transmitting a light emitted from the display panel, the lens panel comprising: first and second substrates facing and spaced apart from each other; first and second electrodes on an inner surface of at least one of the first and second substrates; a lens layer between the first and second substrates; and a liquid crystal layer between the lens layer and one of the first and second substrates, the liquid crystal layer including a nano liquid crystal having a nano capsule filled with a plurality of liquid crystal molecules.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention, are incorporated in and constitute a part of this specification, illustrate implementations of the invention and together with the description serve to explain the principles of the invention.

FIGS. 1A and 1B are cross-sectional views showing a light path of a switchable type display device in a 2D mode and a 3D mode, respectively, according to the related art.

FIGS. 6A and 6B are cross-sectional views showing a light path of a switchable type display device in a 2D mode and a 3D mode, respectively, according to a fifth embodiment of the present disclosure.

DETAILED DESCRIPTION

Figure 1A:
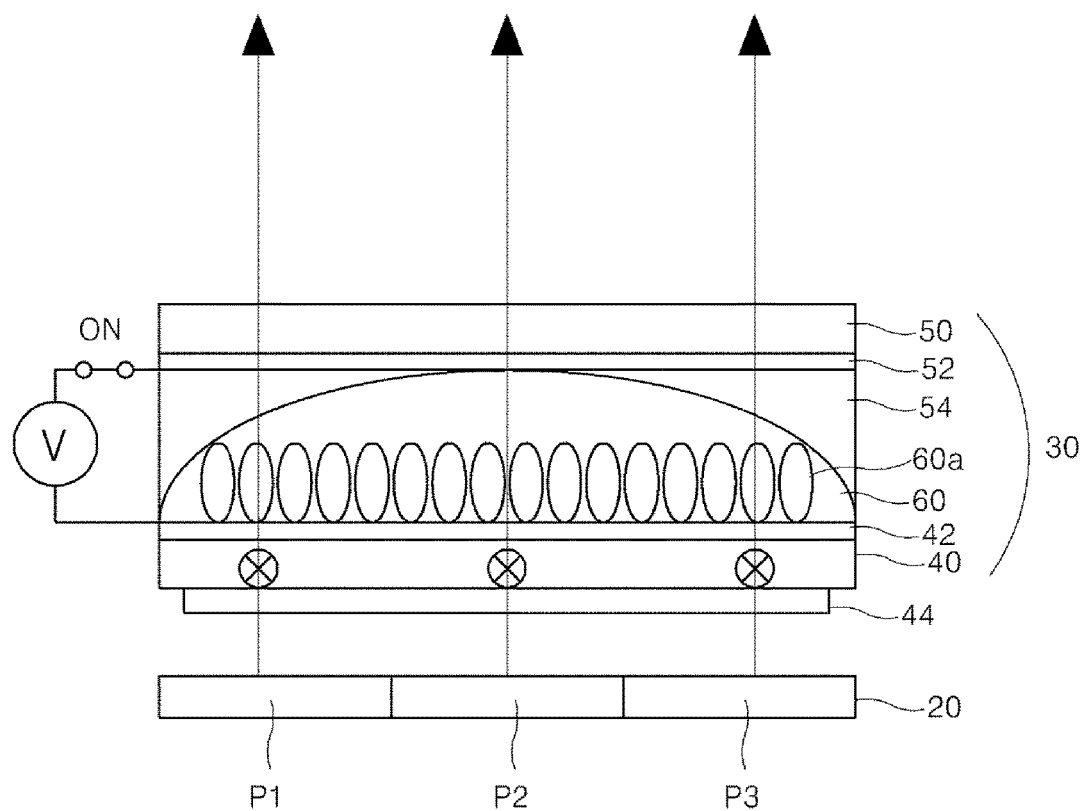

Reference will now be made in detail to embodiments of the present disclosure, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 2A:
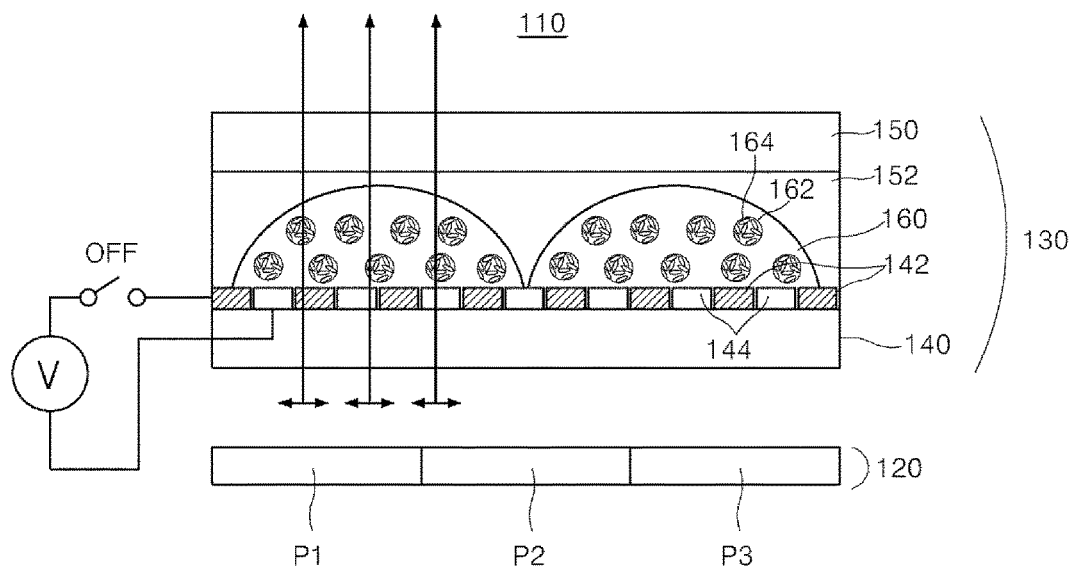
FIGS. 2A and 2B are cross-sectional views showing a light path of a switchable type display device in a 2D mode and a 3D mode, respectively, according to a first embodiment of the present disclosure.
Figure 2B:
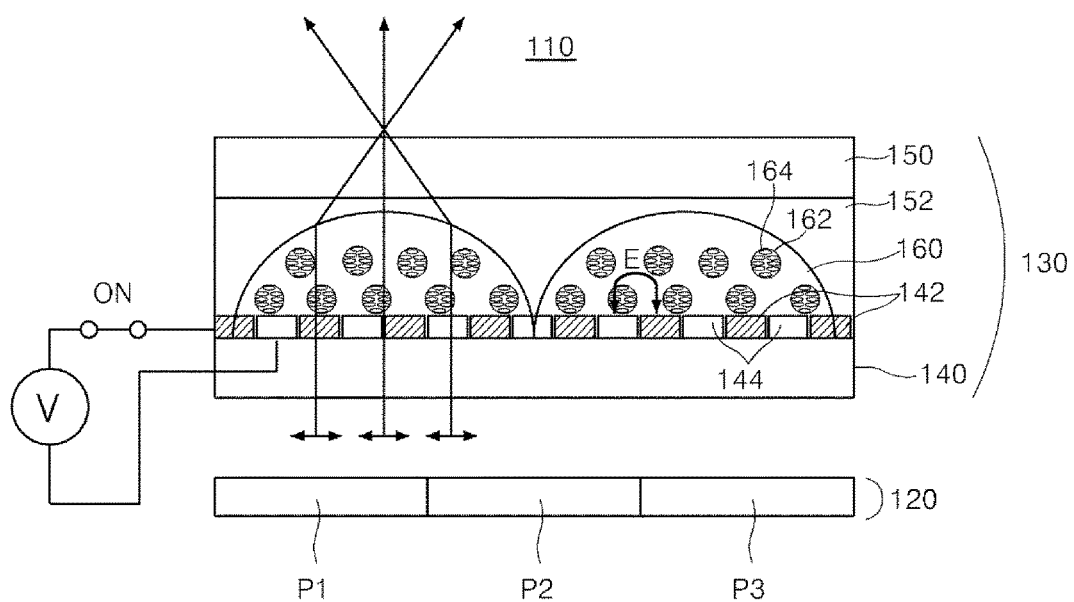

FIGS. 2A and 2B are cross-sectional views showing a light path of a switchable type display device in a 2D mode and a 3D mode, respectively, according to a first embodiment of the present disclosure.

In FIGS. 2A and 2B, a switchable type display device 110 according to a first embodiment of the present disclosure includes a display panel 120 and a lens panel 130. The display panel 120 displays an image using a plurality of pixels including first to third pixels P1 to P3. When the switchable display device 110 displays a two-dimensional (2D) image, the plurality of pixels display a single image. When the switchable display device 110 displays a three-dimensional (3D) image, the plurality of pixels are classified into a plurality of groups corresponding to a plurality of viewing zones and the pixels of each group display a single image corresponding to each viewing zone.

For example, the display panel 120 may be a flat panel display (FPD) such as a liquid crystal display (LCD), an organic light emitting diode (OLED) and a plasma display panel (PDP). The LCD may have one of a twisted nematic (TN) mode, an in-plane switching (IPS) mode, a vertical alignment (VA) mode, an electrically controlled birefringence (ECB) mode and an optically compensated bend (OCB) mode.

The light emitted from the display panel 120 may have a polarized state along a predetermined direction using a polarizing plate (not shown). For example, the light may have a polarized state of a direction perpendicular to a cross-sectional surface. The polarizing plate may be disposed on a top surface of the display panel 120 or may be disposed on a bottom surface of the lens panel 130.

The lens panel 130 is disposed over the display panel 120 and selectively refracts or transmits a light emitted from the display panel 120. The lens panel 130 includes first and second substrates 140 and 150 facing and spaced apart from each other and a liquid crystal layer 160 between the first and second substrates 140 and 150. The first and second substrates 140 and 150 may include a flexible material such as plastic. A plurality of first electrodes 142 and a plurality of second electrodes 144 are formed on an inner surface of the first substrate 140, and a transparent concave lens layer 152 is formed on an inner surface of the second substrate 150.

Each of the plurality of first electrodes 142 and the plurality of second electrodes 144 may have a bar shape and the plurality of first electrodes 142 and the plurality of second electrodes 144 may be alternately disposed. In addition, the plurality of first electrodes 142 and the plurality of second electrodes 144 may be formed of a transparent conductive material such as indium tin oxide (ITO), indium zinc oxide (IZO), conductive polymer, carbon nano tube (CNT), graphene and silver nano wire (AgNW).

The concave lens layer 152 may include a material having a refractive index substantially the same as an average ($AVG(n_o, n_e, n_{bp})$) of an ordinary refractive index ($n_o$) of a liquid crystal molecule 164, an extraordinary refractive index ($n_e$) of a liquid crystal molecule 164 and a refractive index ($n_{bp}$) of a binder polymer within a range which does not influence on control of a light path. For example, the concave lens layer 152 may include a resin such as polyethylene terephthalate (PET).

The concave lens layer 152 may have a plurality of concave portions on a bottom surface thereof and each of the plurality of concave portions may have a half-cylindrical shape or half-elliptic-cylindrical shape. The liquid crystal layer 160 is disposed in the plurality of concave portions between the concave lens layer 152 and the plurality of first electrodes 142 and the plurality of second electrodes 144. Since each of the plurality of concave portions has a cross-section of a half-circular shape or a half-elliptical shape, each of the plurality of concave portions may constitute a spherical concave lens shape or an aspherical concave lens shape.

Although the plurality of first electrodes 142 and the plurality of second electrodes 144 are formed parallel to a longitudinal direction of each concave portion in the first embodiment, the plurality of first electrodes 142 and the plurality of second electrodes 144 may be formed perpendicular to a longitudinal direction of each concave portion in another embodiment. Further, the plurality of first electrodes 142 and the plurality of second electrodes 144 may be formed oblique to a longitudinal direction of each concave portion with a predetermined angle for a structure of overlapping viewing zone in another embodiment.

The liquid crystal layer 160 may include a nano liquid crystal which includes a plurality of nano capsules 162 of a polymer each having a diameter of about 1 nanometer to about 999 nanometers, and each of the plurality of nano capsules 162 may be filled with a plurality of liquid crystal molecules 164. The plurality of liquid crystal molecules 164 may have a positive type having a positive dielectric anisotropy ($\Delta \in (= \in_e - \in_o) > 0$). In addition, the plurality of liquid crystal molecules 164 may have a birefringence property which shows an ordinary refractive index ($n_o$) or an extraordinary refractive index ($n_e$) according to a direction of a light. Further, the plurality of liquid crystal molecules 164 may have a nematic liquid crystal where an ordinary refractive index ($n_o$) is smaller than an extraordinary refractive index ($n_e$) ($n_o < n_e$).

The nano liquid crystal may have an isotropy when an electric field is not applied, and the nano liquid crystal may have an anisotropy due to re-alignment in the nano capsule 162 when an electric field is applied.

Specifically, the nano liquid crystal may be formed as a film type by adding a binder polymer. For example, the concave lens layer 152 may be formed on the second substrate 150 of a film and a nano liquid crystal having the binder polymer may be coated on the concave lens layer 152. Next, the liquid crystal layer 160 may be formed on the concave lens layer 152 by curing the coated nano liquid crystal with a heat or a light. Next, an adhesive layer of a transparent material such as an optically clear adhesive (OCA) may be formed on the liquid crystal layer 160 and a protection film may be formed on the adhesive layer. As a result, the second substrate 150 having the concave lens layer 152 and the liquid crystal layer 160 may be used as a film type.

After the protection film may be removed from the second substrate 150 having the concave lens layer 152 and the liquid crystal layer 160, the second substrate 150 having the concave lens layer 152 and the liquid crystal layer 160 may be attached to the first substrate 140 of a film having the plurality of first electrodes 142 and the plurality of second electrodes 144. As a result, the lens panel 130 may be formed as a film type.

The switchable type display device 110 selectively displays a 2D image or a 3D image according to an alignment state of the liquid crystal layer 160.

In a 2D mode where a 2D image is displayed, as shown in FIG. 2A, a voltage is not applied to the plurality of first electrodes 142 and the plurality of second electrodes 144 (OFF) and an electric field is not generated between the plurality of first electrodes 142 and the plurality of second electrodes 144. As a result, the plurality of liquid crystal molecules 164 of the liquid crystal layer 160 are randomly aligned in each nano capsule 162.

The light from the display panel 120 having a polarized state of a direction parallel to a cross-sectional surface feels that the plurality of liquid crystal molecules 164 have a refractive index corresponding to an average ($AVG(n_o, n_e)$) of an ordinary refractive index ($n_o$) and an extraordinary refractive index ($n_e$). As a result, the light is applied to the liquid crystal layer 160 having a refractive index corresponding to an average ($AVG(n_o, n_e, n_{bp})$) of an ordinary refractive index ($n_o$) of a liquid crystal molecule 164, an extraordinary refractive index ($n_e$) of a liquid crystal molecule 164 and a refractive index ($n_{bp}$) of a binder polymer.

Since the concave lens layer 152 is formed of a material having a refractive index substantially the same as an average ($AVG(n_o, n_e, n_{bp})$) of an ordinary refractive index ($n_o$), an extraordinary refractive index ($n_e$) and a refractive index ($n_{bp}$) of a binder polymer within a range which does not influence control of a light path, the light from the display panel 120 may not be subject to a difference in refractive index at an interface between the liquid crystal layer 160 and the concave lens layer 152. For example, the average ($AVG(n_o, n_e, n_{bp})$) of the ordinary refractive index ($n_o$), the extraordinary refractive index ($n_e$) and the refractive index ($n_{bp}$) of a binder polymer may be within a range of about 1.55 to about 1.6, and the refractive index of the concave lens layer 152 may be within a range of about 1.55 to about 1.6.

Accordingly, the light having the polarized state of a direction parallel to the cross-sectional surface intactly passes through the lens panel 130 without refraction and the switchable type display device 110 displays a 2D image.

In a 3D mode where a 3D image is displayed, as shown in FIG. 2B, a voltage is applied to the plurality of first electrodes 142 and the plurality of second electrodes 144 (ON) and a horizontal electric field E is generated between the plurality of first electrodes 142 and the plurality of second electrodes 144. As a result, the plurality of liquid crystal molecules 164 of a positive type of the liquid crystal layer 160 are re-aligned in each nano capsule 162 such that a long axis of each liquid crystal molecule 164 is parallel to a direction of the horizontal electric field E. The long axis of each liquid crystal molecule 164 may be parallel to the first and second substrates 140 and 150 and parallel to the cross-sectional surface.

The light from the display panel 120 having a polarized state of a direction parallel to a cross-sectional surface feels that the plurality of liquid crystal molecules 164 have an extraordinary refractive index ($n_e$). As a result, the light is applied to the liquid crystal layer 160 having a refractive index corresponding to an average (AVG($n_e$, $n_{bp}$)) of an extraordinary refractive index ($n_e$) of a liquid crystal molecule 164 and a refractive index ($n_{bp}$) of a binder polymer.

Since the concave lens layer 152 is formed of a material having a refractive index substantially the same as an average (AVG($n_o$, $n_e$, $n_{bp}$)) of an ordinary refractive index ($n_o$), an extraordinary refractive index ($n_e$) and a refractive index ($n_{bp}$) of a binder polymer within a range which does not influence control of a light path, the light from the display panel 120 may be subject to a difference in refractive index at an interface between the liquid crystal layer 160 and the concave lens layer 152. For example, since the plurality of liquid crystal molecules 164 may have a nematic liquid crystal where an ordinary refractive index ($n_o$) is smaller than an extraordinary refractive index ($n_e$)($n_o$<$n_e$), the average (AVG($n_e$, $n_{bp}$)) of the extraordinary refractive index ($n_e$) and the refractive index ($n_{bp}$) of a binder polymer may be within a range of about 1.7 to about 1.75 greater than a range of about 1.55 to about 1.6 of the average (AVG($n_o$, $n_e$, $n_{bp}$)) of the ordinary refractive index ($n_o$), the extraordinary refractive index ($n_e$) and the refractive index ($n_{bp}$) of a binder polymer for the concave lens layer 152.

Since the refractive index of the liquid crystal layer 160 is greater than the refractive index of the concave lens layer 152, the lens panel 130 functions as a convex lens and the light from the display panel 120 having the polarized state of a direction parallel to a cross-sectional surface is refracted while passing through the lens panel 130. Accordingly, the switchable type display device 110 displays a 3D image.

Since the switchable type display device 110 uses the nano liquid crystal where each nano capsule 162 is filled with the liquid crystal molecules 164, the switchable type display device 110 may be fabricated using the lens panel 130 of a film type. In addition, fabrication cost is reduced by omitting an orientation film and a planarization film. Further, since the liquid crystal molecules 164 are re-aligned according to the electric field, a uniform alignment property is obtained.

Although the 2D image is displayed without application of the voltage and the 3D image is displayed with application of the voltage using a light having a polarized state of a direction parallel to a cross-sectional surface in the first embodiment, the 2D image may be displayed with application of the voltage and the 3D image may be displayed without application of the voltage by adjusting the ordinary refractive index ($n_o$) and the extraordinary refractive index ($n_e$) of the liquid crystal molecule 164 and the refractive index of the concave lens layer 152 and using a light having a polarized state of a direction perpendicular to a cross-sectional surface in another embodiment.

Further, although the 2D image or the 3D image is selectively displayed using the concave lens layer 152 and the positive type liquid crystal in the first embodiment, the 2D image or the 3D image may be selectively displayed using a concave lens layer, a negative type liquid crystal and a light having a polarized state of a direction parallel to a cross-sectional surface in another embodiment, or the 2D image or the 3D image may be selectively displayed using a concave lens layer, a negative type liquid crystal and a light having a polarized state of a direction perpendicular to a cross-sectional surface in another embodiment.

In addition, although the positive type liquid crystal is used in the first embodiment, a negative type liquid crystal may be used in another embodiment.

Figure 3A:
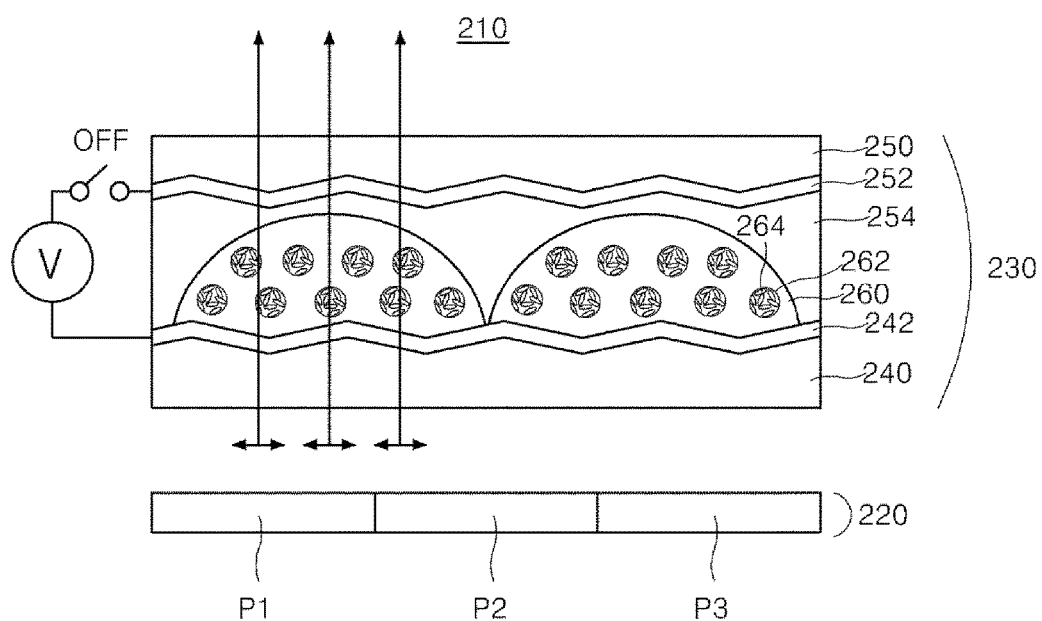
FIGS. 3A and 3B are cross-sectional views showing a light path of a switchable type display device in a 2D mode and a 3D mode, respectively, according to a second embodiment of the present disclosure.
Figure 3B:
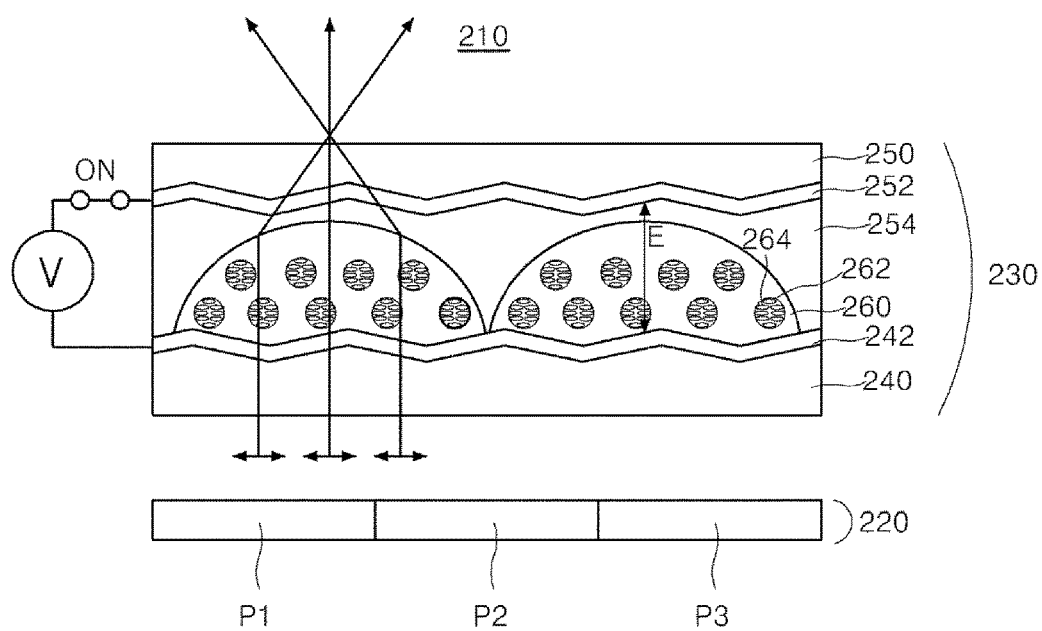

FIGS. 3A and 3B are cross-sectional views showing a light path of a switchable type display device in a 2D mode and a 3D mode, respectively, according to a second embodiment of the present disclosure. An illustration for parts of the second embodiment having the same structure as the first embodiment will be omitted.

In FIGS. 3A and 3B, a switchable type display device 210 according to a second embodiment of the present disclosure includes a display panel 220 and a lens panel 230. The display panel 220 displays a 2D image or a 3D image using a plurality of pixels including first to third pixels P1 to P3. For example, the display panel 220 may be a FPD such as an LCD, an OLED and a PDP. The LCD may have one of a TN mode, an IPS mode, a VA mode, an ECB mode and an OCB mode.

The light emitted from the display panel 220 may have a polarized state along a predetermined direction using a polarizing plate (not shown). For example, the light may have a polarized state of a direction parallel to a cross-sectional surface.

The lens panel 230 is disposed over the display panel 220 and selectively refracts or transmits a light emitted from the display panel 220. The lens panel 230 includes first and second substrates 240 and 250 facing and spaced apart from each other and a liquid crystal layer 260 between the first and second substrates 240 and 250. The first and second substrates 240 and 250 may include a flexible material such as plastic. First and second electrodes 242 and 252 are formed on inner surfaces of the first and second substrates 240 and 250, respectively, and a transparent concave lens layer 254 is formed on the second electrode 252.

The first and second electrodes 242 and 252 may have a plate shape corresponding to an entire surface of the first and second substrates 240 and 250. In addition, the first and second electrodes 242 and 252 may be formed of a transparent conductive material such as ITO, IZO, conductive polymer, CNT, graphene and AgNW.

The concave lens layer 254 may include a material having a refractive index substantially the same as an average (AVG($n_o$, $n_e$, $n_{bp}$)) of an ordinary refractive index ($n_o$) of a liquid crystal molecule 264, an extraordinary refractive index ($n_e$) of a liquid crystal molecule 264 and a refractive index ($n_{bp}$) of a binder polymer within a range which does not influence on control of a light path. For example, the concave lens layer 254 may include a resin such as PET.

An uneven pattern may be formed on each of the inner surface of the first substrate 240, the first electrode 242, the inner surface of the second substrate 250 and the second electrode 252 for inducing a re-alignment of the liquid crystal molecules 264 when an electric field is applied. The uneven pattern along a direction perpendicular to the cross-sectional surface may include a protrusion part and a concave part parallel to and alternating each other.

The concave lens layer 254 may have a plurality of concave portions on a bottom surface thereof and each of the plurality of concave portions may have a half-cylindrical shape or half-elliptic-cylindrical shape. The liquid crystal layer 260 is disposed in the plurality of concave portions between the concave lens layer 254 and the first electrodes 242. Since each of the plurality of concave portions has a cross-section of a half-circular shape or a half-elliptical shape, each of the plurality of concave portions may constitute a spherical concave lens shape or an aspherical concave lens shape.

The liquid crystal layer 260 may include a nano liquid crystal which includes a plurality of nano capsules 262 of a polymer each having a diameter of about 1 nanometer to about 999 nanometers, and each of the plurality of nano capsules 262 may be filled with a plurality of liquid crystal molecules 264. The plurality of liquid crystal molecules 264 may have a negative type having a negative dielectric anisotropy ($\Delta\varepsilon<0$). In addition, the plurality of liquid crystal molecules 264 may have a birefringence property which shows an ordinary refractive index ($n_o$) or an extraordinary refractive index ($n_e$) according to a direction of a light. Further, the plurality of liquid crystal molecules 264 may have a nematic liquid crystal where an ordinary refractive index ($n_o$) is smaller than an extraordinary refractive index ($n_e$)($n_o<n_e$).

The nano liquid crystal may have an isotropy when an electric field is not applied, and the nano liquid crystal may have an anisotropy due to re-alignment in the nano capsule 262 when an electric field is applied.

Specifically, the nano liquid crystal may be formed as a film type by adding a binder polymer. For example, the second electrode 252 and the concave lens layer 254 may be sequentially formed on the second substrate 250 of a film and a nano liquid crystal having the binder polymer may be coated on the concave lens layer 254. Next, the liquid crystal layer 260 may be formed on the concave lens layer 254 by curing the coated nano liquid crystal with a heat or a light. Next, an adhesive layer of a transparent material such as an optically clear adhesive (OCA) may be formed on the liquid crystal layer 260 and a protection film may be formed on the adhesive layer. As a result, the second substrate 250 having the second electrode 252, the concave lens layer 254 and the liquid crystal layer 260 may be used as a film type.

After the protection film may be removed from the second substrate 250 having the second electrode 252, the concave lens layer 254 and the liquid crystal layer 260, the second substrate 250 having the second electrode 252, the concave lens layer 254 and the liquid crystal layer 260 may be attached to the first substrate 240 of a film having the first electrode 242. As a result, the lens panel 230 may be formed as a film type.

The switchable type display device 210 selectively displays a 2D image or a 3D image according to an alignment state of the liquid crystal layer 260.

In a 2D mode where a 2D image is displayed, as shown in FIG. 3A, a voltage is not applied to the first and second electrodes 242 and 252 (OFF) and an electric field is not generated between the first and second electrodes 242 and 252. As a result, the plurality of liquid crystal molecules 264 of the liquid crystal layer 260 are randomly aligned in each nano capsule 262.

The light from the display panel 220 having a polarized state of a direction parallel to a cross-sectional surface feels that the plurality of liquid crystal molecules 264 have a refractive index corresponding to an average (AVG($n_o$, $n_e$)) of an ordinary refractive index ($n_o$) and an extraordinary refractive index ($n_e$). As a result, the light is applied to the liquid crystal layer 260 having a refractive index corresponding to an average (AVG($n_o$, $n_e$, $n_{bp}$)) of an ordinary refractive index ($n_o$) of a liquid crystal molecule 264, an extraordinary refractive index ($n_e$) of a liquid crystal molecule 264 and a refractive index ($n_{bp}$) of a binder polymer.

Since the concave lens layer 254 is formed of a material having a refractive index substantially the same as an average (AVG($n_o$, $n_e$, $n_{bp}$)) of an ordinary refractive index ($n_o$), an extraordinary refractive index ($n_e$) and a refractive index ($n_{bp}$) of a binder polymer within a range which does not influence on control of a light path, the light from the display panel 220 may not be subject to a difference in refractive index at an interface between the liquid crystal layer 260 and the concave lens layer 254. For example, the average (AVG($n_o$, $n_e$, $n_{bp}$)) of the ordinary refractive index ($n_o$), the extraordinary refractive index ($n_e$) and the refractive index ($n_{bp}$) of a binder polymer may be within a range of about 1.55 to about 1.6, and the refractive index of the concave lens layer 254 may be within a range of about 1.55 to about 1.6.

Accordingly, the light having the polarized state of a direction parallel to the cross-sectional surface intactly passes through the lens panel 230 without refraction and the switchable type display device 210 displays a 2D image.

In a 3D mode where a 3D image is displayed, as shown in FIG. 3B, a voltage is applied to the first and second electrodes 242 and 252 (ON) and a vertical electric field E is generated between the first and second electrodes 242 and 252. As a result, the plurality of liquid crystal molecules 264 of a negative type of the liquid crystal layer 260 are re-aligned in each nano capsule 262 such that a long axis of each liquid crystal molecule 264 is perpendicular to a direction of the vertical electric field E. The long axis of each liquid crystal molecule 264 may be parallel to the first and second substrates 240 and 250 and parallel to the cross-sectional surface.

The light from the display panel 220 having a polarized state of a direction parallel to a cross-sectional surface is applied to the plurality of liquid crystal molecules 264 having an extraordinary refractive index ($n_e$). As a result, the light is applied to the liquid crystal layer 260 having a refractive index corresponding to an average (AVG($n_e$, $n_{bp}$)) of an extraordinary refractive index ($n_e$) of a liquid crystal molecule 264 and a refractive index ($n_{bp}$) of a binder polymer.

Since the concave lens layer 254 is formed of a material having a refractive index substantially the same as an average (AVG($n_o$, $n_e$, $n_{bp}$)) of an ordinary refractive index ($n_o$), an extraordinary refractive index ($n_e$) and a refractive index ($n_{bp}$) of a binder polymer within a range which does not influence control of a light path, the light from the display panel 220 may be subject to a difference in refractive index at an interface between the liquid crystal layer 260 and the concave lens layer 254. For example, since the plurality of liquid crystal molecules 264 may have a nematic liquid crystal where an ordinary refractive index ($n_o$) is smaller than an extraordinary refractive index ($n_e$)($n_o<n_e$), the average (AVG($n_e$, $n_{bp}$)) of the extraordinary refractive index ($n_e$) and the refractive index ($n_{bp}$) of a binder polymer may be within a range of about 1.7 to about 1.75 greater than a range of about 1.55 to about 1.6 of the average (AVG($n_o$, $n_e$, $n_{bp}$)) of the ordinary refractive index ($n_o$), the extraordinary refractive index ($n_e$) and the refractive index ($n_{bp}$) of a binder polymer for the concave lens layer 254.

Since the refractive index of the liquid crystal layer 260 is greater than the refractive index of the concave lens layer 254, the lens panel 230 functions as a convex lens and the light from the display panel 220 having the polarized state of a direction parallel to a cross-sectional surface is refracted while passing through the lens panel 230. Accordingly, the switchable type display device 210 displays a 3D image.

Since the switchable type display device 210 uses the nano liquid crystal where each nano capsule 262 is filled with the liquid crystal molecules 264, the switchable type display device 210 may be fabricated using the lens panel 230 of a film type. In addition, fabrication cost is reduced by omitting an orientation film and a planarization film. Further, since the liquid crystal molecules 264 are re-aligned according to the electric field, a uniform alignment property is obtained.

Although the 2D image is displayed without application of the voltage and the 3D image is displayed with application of the voltage in the second embodiment, the 2D image may be displayed with application of the voltage and the 3D image may be displayed without application of the voltage by adjusting the ordinary refractive index ($n_o$) and the extraordinary refractive index ($n_e$) of the liquid crystal molecule 264 and the refractive index of the concave lens layer 254 and using a light having a polarized state of a direction perpendicular to a cross-sectional surface in another embodiment.

In addition, although the liquid crystal layer is formed between the first substrate and the concave lens layer of the second substrate in the first and second embodiments, the liquid crystal layer may be formed between the convex lens layer of the first substrate and the second substrate in another embodiment.

Figure 4A:
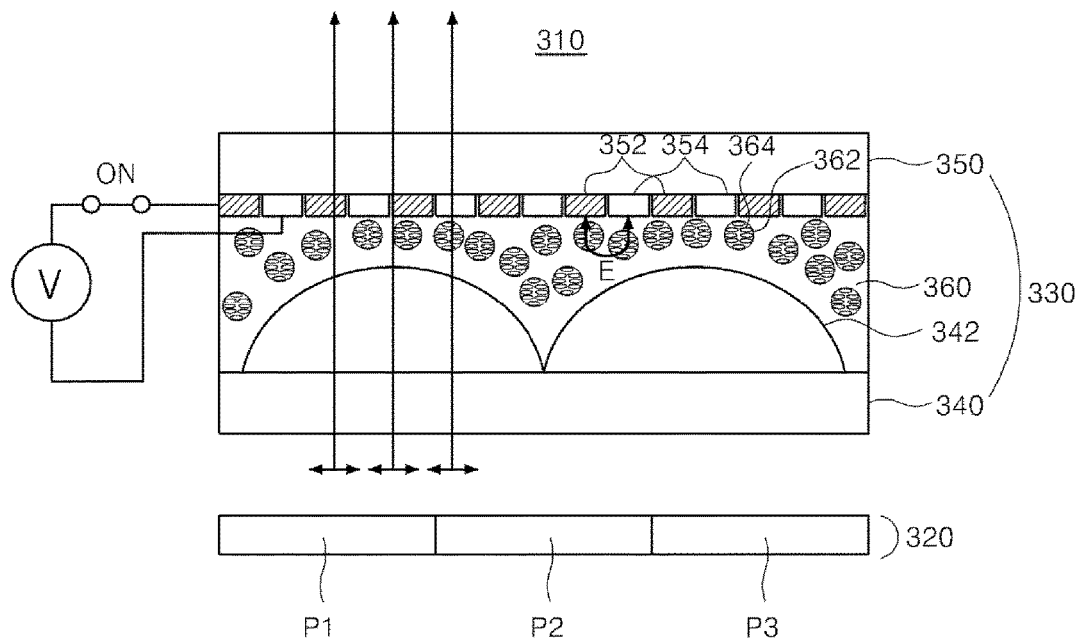
FIGS. 4A and 4B are cross-sectional views showing a light path of a switchable type display device in a 2D mode and a 3D mode, respectively, according to a third embodiment of the present disclosure.
Figure 4B:
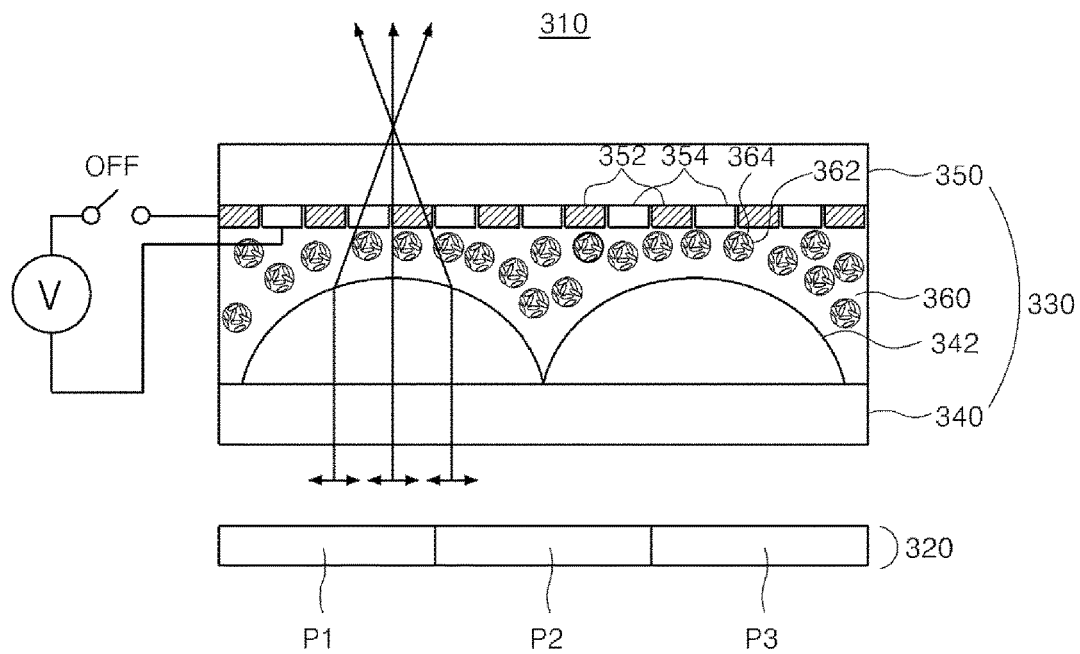

FIGS. 4A and 4B are cross-sectional views showing a light path of a switchable type display device in a 2D mode and a 3D mode, respectively, according to a third embodiment of the present disclosure. An illustration for parts of the third embodiment having the same structure as the first and second embodiments will be omitted.

In FIGS. 4A and 4B, a switchable type display device 310 according to a third embodiment of the present disclosure includes a display panel 320 and a lens panel 330. The display panel 320 displays a 2D image or a 3D image using a plurality of pixels including first to third pixels P1 to P3. For example, the display panel 320 may be a FPD such as an LCD, an OLED and a PDP. The LCD may have one of a TN mode, an IPS mode, a VA mode, an ECB mode and an OCB mode.

The light emitted from the display panel 320 may have a polarized state along a predetermined direction using a polarizing plate (not shown). For example, the light may have a polarized state of a direction parallel to a cross-sectional surface.

The lens panel 330 is disposed over the display panel 320 and selectively refracts or transmits a light emitted from the display panel 320. The lens panel 330 includes first and second substrates 340 and 350 facing and spaced apart from each other and a liquid crystal layer 360 between the first and second substrates 340 and 350. The first and second substrates 340 and 350 may include a flexible material such as plastic. A transparent convex lens layer 342 is formed on an inner surface of the first substrate 340, and a plurality of first electrodes 352 and a plurality of second electrodes 354 are formed on an inner surface of the second substrate 350.

The convex lens layer 342 may include a material having a refractive index substantially the same as an average (AVG($n_e$, $n_{bp}$)) of an extraordinary refractive index ($n_e$) of a liquid crystal molecule 364 and a refractive index ($n_{bp}$) of a binder polymer within a range which does not influence on control of a light path. For example, the convex lens layer 342 may include a resin such as PET.

The convex lens layer 342 may have a plurality of convex portions on a bottom surface thereof and each of the plurality of convex portions may have a half-cylindrical shape or half-elliptic-cylindrical shape. The liquid crystal layer 360 is disposed between the convex lens layer 342 and the plurality of first electrodes 352 and the plurality of second electrodes 354. Since each of the plurality of convex portions has a cross-section of a half-circular shape or a half-elliptical shape, each of the plurality of convex portions may constitute a spherical convex lens shape or an aspherical convex lens shape.

Each of the plurality of first electrodes 352 and the plurality of second electrodes 354 may have a bar shape, and the plurality of first electrodes 352 and the plurality of second electrodes 354 may be disposed alternately. In addition, the plurality of first electrodes 352 and the plurality of second electrodes 354 may be formed of a transparent conductive material such as ITO, IZO, conductive polymer, CNT, graphene and AgNW.

Although the plurality of first electrodes 352 and the plurality of second electrodes 354 are formed parallel to a longitudinal direction of each convex portion in the third embodiment, the plurality of first electrodes 352 and the plurality of second electrodes 354 may be formed perpendicular to a longitudinal direction of each convex portion in another embodiment. Further, the plurality of first electrodes 352 and the plurality of second electrodes 354 may be formed oblique to a longitudinal direction of each convex portion with a predetermined angle for a structure of overlapping viewing zone in another embodiment.

The liquid crystal layer 360 may include a nano liquid crystal which includes a plurality of nano capsules 362 of a polymer each having a diameter of about 1 nanometer to about 999 nanometers, and each of the plurality of nano capsules 362 may be filled with a plurality of liquid crystal molecules 364. The plurality of liquid crystal molecules 364 may have a positive type having a positive dielectric anisotropy ($\Delta\epsilon>0$). In addition, the plurality of liquid crystal molecules 364 may have a birefringence property which shows an ordinary refractive index ($n_o$) or an extraordinary refractive index ($n_e$) according to a direction of a light. Further, the plurality of liquid crystal molecules 364 may have a nematic liquid crystal where an ordinary refractive index ($n_o$) is smaller than an extraordinary refractive index ($n_e$)($n_o<n_e$).

The nano liquid crystal may have an isotropy when an electric field is not applied, and the nano liquid crystal may have an anisotropy due to re-alignment in the nano capsule 362 when an electric field is applied.

Specifically, the nano liquid crystal may be formed as a film type by adding a binder polymer. For example, the convex lens layer 342 may be formed on the first substrate 340 of a film and a nano liquid crystal having the binder polymer may be coated on the convex lens layer 342. Next, the liquid crystal layer 360 may be formed on the convex lens layer 342 by curing the coated nano liquid crystal with a heat or a light. Next, an adhesive layer of a transparent material such as an optically clear adhesive (OCA) may be formed on the liquid crystal layer 360 and a protection film may be formed on the adhesive layer. As a result, the first substrate 340 having the convex lens layer 342 and the liquid crystal layer 360 may be used as a film type.

After the protection film may be removed from the first substrate 340 having the convex lens layer 342 and the liquid crystal layer 360, the first substrate 340 having the convex lens layer 342 and the liquid crystal layer 360 may be attached to the second substrate 350 of a film having the plurality of first electrodes 352 and the plurality of second electrodes 354. As a result, the lens panel 330 may be formed as a film type.

The switchable type display device 310 selectively displays a 2D image or a 3D image according to an alignment state of the liquid crystal layer 360.

In a 2D mode where a 2D image is displayed, as shown in FIG. 4A, a voltage is applied to the plurality of first electrodes 352 and the plurality of second electrodes 354 (ON) and a horizontal electric field E is generated between the plurality of first electrodes 352 and the plurality of second electrodes 354. As a result, the plurality of liquid crystal molecules 364 of a positive type of the liquid crystal layer 360 are re-aligned in each nano capsule 362 such that a long axis of each liquid crystal molecules 364 is parallel to a direction of the horizontal electric field E. The long axis of each liquid crystal molecule 364 may be parallel to the first and second substrates 340 and 350 and parallel to the cross-sectional surface.

The light from the display panel 320 having a polarized state of a direction parallel to a cross-sectional surface is applied to the plurality of liquid crystal molecules 364 having an extraordinary refractive index ($n_e$). As a result, the light is applied to the liquid crystal layer 360 having a refractive index corresponding to an average (AVG($n_e$, $n_{bp}$)) of an extraordinary refractive index ($n_e$) of a liquid crystal molecule 364 and a refractive index ($n_{bp}$) of a binder polymer.

Since the convex lens layer 342 is formed of a material having a refractive index substantially the same as an average (AVG($n_e$, $n_{bp}$)) of an extraordinary refractive index ($n_e$) and a refractive index ($n_{bp}$) of a binder polymer within a range which does not influence on control of a light path, the light from the display panel 320 may not be subject to a difference in refractive index at an interface between the convex lens layer 342 and the liquid crystal layer 360. For example, the refractive index of the convex lens layer 342 may be within a range of about 1.7 to about 1.75, and the average (AVG($n_e$, $n_{bp}$)) of the extraordinary refractive index ($n_e$) and the refractive index ($n_{bp}$) of a binder polymer may be within a range of about 1.7 to about 1.75.

Accordingly, the light having the polarized state of a direction parallel to the cross-sectional surface intactly passes through the lens panel 330 without refraction and the switchable type display device 310 displays a 2D image.

In a 3D mode where a 3D image is displayed, as shown in FIG. 4B, a voltage is not applied to the plurality of first electrodes 352 and the plurality of second electrodes 354 (OFF) and an electric field is not generated between the plurality of first electrodes 352 and the plurality of second electrodes 354. As a result, the plurality of liquid crystal molecules 364 of a positive type of the liquid crystal layer 360 are randomly aligned in each nano capsule 362.

The light from the display panel 320 having a polarized state of a direction parallel to a cross-sectional surface feels that the plurality of liquid crystal molecules 364 have a refractive index corresponding to an average (AVG($n_o$, $n_e$)) of an ordinary refractive index ($n_o$) and an extraordinary refractive index ($n_e$). As a result, the light is applied to the liquid crystal layer 360 having a refractive index corresponding to an average (AVG($n_o$, $n_e$, $n_{bp}$)) of an ordinary refractive index ($n_o$) of a liquid crystal molecule 364, an extraordinary refractive index ($n_e$) of a liquid crystal molecule 364 and a refractive index ($n_{bp}$) of a binder polymer.

Since the convex lens layer 342 is formed of a material having a refractive index substantially the same as an average (AVG($n_e$, $n_{bp}$)) of an extraordinary refractive index ($n_e$) and a refractive index ($n_{bp}$) of a binder polymer within a range which does not influence on control of a light path, the light from the display panel 320 may be subject to a difference in refractive index at an interface between the convex lens layer 342 and the liquid crystal layer 360. For example, since the plurality of liquid crystal molecules 364 may have a nematic liquid crystal where an ordinary refractive index ($n_o$) is smaller than an extraordinary refractive index ($n_e$)($n_o$<$n_e$), the average (AVG($n_o$, $n_e$, $n_{bp}$)) of the ordinary refractive index ($n_o$), the extraordinary refractive index ($n_e$) and the refractive index ($n_{bp}$) of a binder polymer may be within a range of about 1.55 to about 1.6 smaller than a range of about 1.7 to about 1.75 of the average (AVG($n_e$, $n_{bp}$)) of the extraordinary refractive index ($n_e$) and the refractive index ($n_{bp}$) of a binder polymer for the convex lens layer 342.

Since the refractive index of the convex lens layer 342 is greater than the refractive index of the liquid crystal layer 360, the lens panel 330 functions as a convex lens and the light from the display panel 320 having the polarized state of a direction parallel to a cross-sectional surface is refracted while passing through the lens panel 330. Accordingly, the switchable type display device 310 displays a 3D image.

Since the switchable type display device 310 uses the nano liquid crystal where each nano capsule 362 is filled with the liquid crystal molecules 364, the switchable type display device 310 may be fabricated using the lens panel 330 of a film type. In addition, fabrication cost is reduced by omitting an orientation film and a planarization film. Further, since the liquid crystal molecules 364 are re-aligned according to the electric field, a uniform alignment property is obtained.

Although the 2D image is displayed with application of the voltage and the 3D image is displayed without application of the voltage in the third embodiment, the 2D image may be displayed without application of the voltage and the 3D image may be displayed with application of the voltage by adjusting the refractive index of the convex lens layer 342 and the polarized state of the incident light in another embodiment.

Figure 5A:
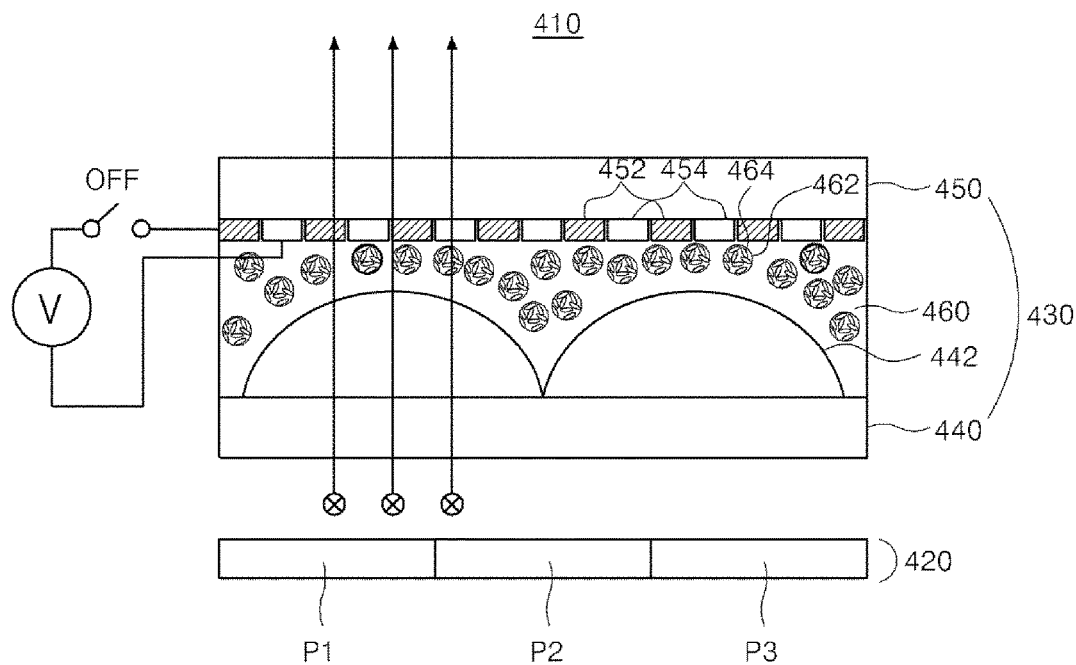
FIGS. 5A and 5B are cross-sectional views showing a light path of a switchable type display device in a 2D mode and a 3D mode, respectively, according to a fourth embodiment of the present disclosure.
Figure 5B:
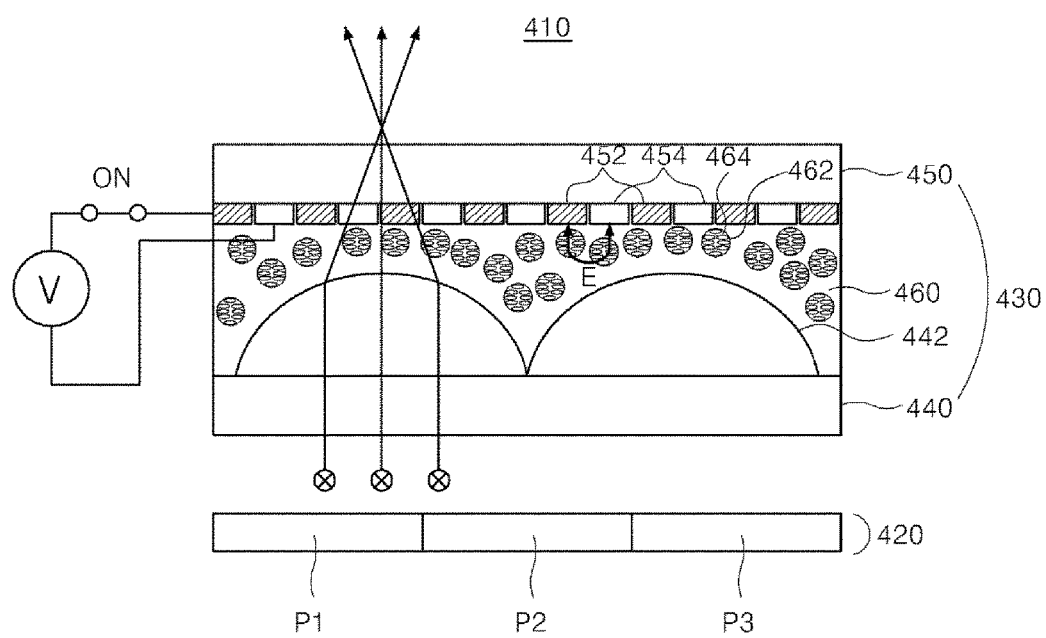

FIGS. 5A and 5B are cross-sectional views showing a light path of a switchable type display device in a 2D mode and a 3D mode, respectively, according to a fourth embodiment of the present disclosure. An illustration for parts of the fourth embodiment having the same structure as the first and second embodiments will be omitted.

In FIGS. 5A and 5B, a switchable type display device 410 according to a fourth embodiment of the present disclosure includes a display panel 420 and a lens panel 430. The display panel 420 displays a 2D image or a 3D image using a plurality of pixels including first to third pixels P1 to P3. For example, the display panel 420 may be a FPD such as an LCD, an OLED and a PDP. The LCD may have one of a TN mode, an IPS mode, a VA mode, an ECB mode and an OCB mode.

The light emitted from the display panel 420 may have a polarized state along a predetermined direction using a polarizing plate (not shown). For example, the light may have a polarized state of a direction perpendicular to a cross-sectional surface.

The lens panel 430 is disposed over the display panel 420 and selectively refracts or transmits a light emitted from the display panel 420. The lens panel 430 includes first and second substrates 440 and 450 facing and spaced apart from each other and a liquid crystal layer 460 between the first and second substrates 440 and 450. The first and second substrates 440 and 450 may include a flexible material such as plastic. A transparent convex lens layer 442 is formed on an inner surface of the first substrate 440, and a plurality of first electrodes 452 and a plurality of second electrodes 454 are formed on an inner surface of the second substrate 450.

The convex lens layer 442 may include a material having a refractive index substantially the same as an average ($AVG(n_o, n_e, n_{bp})$) of an ordinary refractive index ($n_o$) of a liquid crystal molecule 464, an extraordinary refractive index ($n_e$) of a liquid crystal molecule 464 and a refractive index ($n_{bp}$) of a binder polymer within a range which does not influence on control of a light path. For example, the convex lens layer 442 may include a resin such as PET.

The convex lens layer 442 may have a plurality of convex portions on a bottom surface thereof and each of the plurality of convex portions may have a half-cylindrical shape or half-elliptic-cylindrical shape. The liquid crystal layer 460 is disposed between the convex lens layer 442 and the plurality of first electrodes 452 and the plurality of second electrodes 454. Since each of the plurality of convex portions has a cross-section of a half-circular shape or a half-elliptical shape, each of the plurality of convex portions may constitute a spherical convex lens shape or an aspherical convex lens shape.

Each of the plurality of first electrodes 452 and the plurality of second electrodes 454 may have a bar shape, and the plurality of first electrodes 452 and the plurality of second electrodes 454 may be disposed alternately. In addition, the plurality of first electrodes 452 and the plurality of second electrodes 454 may be formed of a transparent conductive material such as ITO, IZO, conductive polymer, CNT, graphene and AgNW.

The liquid crystal layer 460 may include a nano liquid crystal which includes a plurality of nano capsules 462 of a polymer each having a diameter of about 1 nanometer to about 999 nanometers, and each of the plurality of nano capsules 462 may be filled with a plurality of liquid crystal molecules 464. The plurality of liquid crystal molecules 464 may have a positive type having a positive dielectric anisotropy ($\Delta\varepsilon > 0$). In addition, the plurality of liquid crystal molecules 464 may have a birefringence property which shows an ordinary refractive index ($n_o$) or an extraordinary refractive index ($n_e$) according to a direction of a light. Further, the plurality of liquid crystal molecules 464 may have a nematic liquid crystal where an ordinary refractive index ($n_o$) is smaller than an extraordinary refractive index ($n_e$) ($n_o < n_e$).

The nano liquid crystal may have an isotropy when an electric field is not applied, and the nano liquid crystal may have an anisotropy due to re-alignment in the nano capsule 462 when an electric field is applied. Specifically, the nano liquid crystal may be formed as a film type by adding a binder polymer.

The switchable type display device 410 selectively displays a 2D image or a 3D image according to an alignment state of the liquid crystal layer 460.

In a 2D mode where a 2D image is displayed, as shown in FIG. 5A, a voltage is not applied to the plurality of first electrodes 452 and the plurality of second electrodes 454 (OFF) and an electric field is not generated between the plurality of first electrodes 452 and the plurality of second electrodes 454. As a result, the plurality of liquid crystal molecules 464 of a positive type of the liquid crystal layer 460 are randomly aligned in each nano capsule 462.

The light from the display panel 420 having a polarized state of a direction perpendicular to a cross-sectional surface feels that the plurality of liquid crystal molecules 464 have a refractive index corresponding to an average ($AVG(n_o, n_e)$) of an ordinary refractive index ($n_o$) and an extraordinary refractive index ($n_e$). As a result, the light is applied to the liquid crystal layer 460 having a refractive index corresponding to an average ($AVG(n_o, n_e, n_{bp})$) of an ordinary refractive index ($n_o$) of a liquid crystal molecule 464, an extraordinary refractive index ($n_e$) of a liquid crystal molecule 464 and a refractive index ($n_{bp}$) of a binder polymer.

Since the convex lens layer 442 is formed of a material having a refractive index substantially the same as an average ($AVG(n_o, n_e, n_{bp})$) of an ordinary refractive index ($n_o$), an extraordinary refractive index ($n_e$) and a refractive index ($n_{bp}$) of a binder polymer within a range which does not influence control of a light path, the light from the display panel 420 may not be subject to a difference in refractive index at an interface between the convex lens layer 442 and the liquid crystal layer 460. For example, the refractive index of the convex lens layer 442 may be within a range of about 1.55 to about 1.6, and the average ($AVG(n_o, n_e, n_{bp})$) of the ordinary refractive index ($n_o$), the extraordinary refractive index ($n_e$) and the refractive index ($n_{bp}$) of a binder polymer may be within a range of about 1.55 to about 1.6.

Accordingly, the light having the polarized state of a direction perpendicular to the cross-sectional surface intactly passes through the lens panel 430 without refraction and the switchable type display device 410 displays a 2D image.

In a 3D mode where a 3D image is displayed, as shown in FIG. 5B, a voltage is applied to the plurality of first electrodes 452 and the plurality of second electrodes 454 (ON) and a horizontal electric field E is generated between the plurality of first electrodes 452 and the plurality of second electrodes 454. As a result, the plurality of liquid crystal molecules 464 of a positive type of the liquid crystal layer 460 are re-aligned in each nano capsule 462 such that a long axis of each liquid crystal molecules 464 is parallel to a direction of the horizontal electric field E. The long axis of each liquid crystal molecule 464 may be parallel to the first and second substrates 440 and 450 and parallel to the cross-sectional surface.

The light from the display panel 420 having a polarized state of a direction perpendicular to a cross-sectional surface feels that the plurality of liquid crystal molecules 464 have an ordinary refractive index ($n_o$). As a result, the light feels that the liquid crystal layer 460 has a refractive index corresponding to an average ($AVG(n_o, n_{bp})$) of an ordinary refractive index ($n_o$) of a liquid crystal molecule 464 and a refractive index ($n_{bp}$) of a binder polymer.

Since the convex lens layer 442 is formed of a material having a refractive index substantially the same as an average ($AVG(n_o, n_e, n_{bp})$) of an ordinary refractive index ($n_o$), an extraordinary refractive index ($n_e$) and a refractive index ($n_{bp}$) of a binder polymer within a range which does not influence control of a light path, the light from the display panel 420 may be subject to a difference in refractive index at an interface between the convex lens layer 442 and the liquid crystal layer 460. For example, since the plurality of liquid crystal molecules 464 may have a nematic liquid crystal where an ordinary refractive index ($n_o$) is smaller than an extraordinary refractive index ($n_e$) ($n_o < n_e$), the average ($AVG(n_o, n_{bp})$) of the ordinary refractive index ($n_o$) and the refractive index ($n_{bp}$) of a binder polymer may be within a range of about 1.45 to about 1.5 smaller than a range of about 1.55 to about 1.6 of the average ($AVG(n_o, n_e, n_{bp})$) of the ordinary refractive index ($n_o$), the extraordinary refractive index ($n_e$) and the refractive index ($n_{bp}$) of a binder polymer for the convex lens layer 442.

Since the refractive index of the convex lens layer 442 is greater than the refractive index of the liquid crystal layer 460, the lens panel 430 functions as a convex lens and the light from the display panel 420 having the polarized state of a direction perpendicular to a cross-sectional surface is refracted while passing through the lens panel 430. Accordingly, the switchable type display device 410 displays a 3D image.

Since the switchable type display device 410 uses the nano liquid crystal where each nano capsule 462 is filled with the liquid crystal molecules 464, the switchable type display device 410 may be fabricated using the lens panel 430 of a film type. In addition, fabrication cost is reduced by omitting an orientation film and a planarization film. Further, since the liquid crystal molecules 464 are re-aligned according to the electric field, a uniform alignment property is obtained.

Although the 2D image or the 3D image is selectively displayed using the convex lens layer, the positive type liquid crystal and the light having a polarized state of a direction perpendicular to the cross-sectional surface in the third and fourth embodiments, a 2D image may be displayed with application of the voltage and a 3D image may be displayed without application of the voltage by adjusting the ordinary refractive index ($n_o$) and the extraordinary refractive index ($n_e$) of a liquid crystal molecule and the refractive index of the convex lens layer and using a negative type liquid crystal and a light having a polarized state of a direction parallel to a cross-sectional surface in another embodiment, or a 2D image may be displayed with application of the voltage and a 3D image may be displayed without application of the voltage by adjusting the ordinary refractive index ($n_o$) and the extraordinary refractive index ($n_e$) of a liquid crystal molecule and the refractive index of the convex lens layer and using a negative type liquid crystal and a light having a polarized state of a direction perpendicular to a cross-sectional surface in another embodiment.

Although the positive type liquid crystal is used in the third and fourth embodiments, the negative type liquid crystal may be used in another embodiment.

FIGS. 6A and 6B are cross-sectional views showing a light path of a switchable type display device in a 2D mode and a 3D mode, respectively, according to a fifth embodiment of the present disclosure. An illustration for parts of the second embodiment having the same structure as the first embodiment will be omitted.

In FIGS. 6A and 6B, a switchable type display device 510 according to a fifth embodiment of the present disclosure includes a display panel 520 and a lens panel 530. The display panel 520 displays a 2D image or a 3D image using a plurality of pixels including first to third pixels P1 to P3. For example, the display panel 520 may be a FPD such as an LCD, an OLED and a PDP. The LCD may have one of a TN mode, an IPS mode, a VA mode, an ECB mode and an OCB mode.

The light emitted from the display panel 520 may have a polarized state along a predetermined direction using a polarizing plate (not shown). For example, the light may have a polarized state of a direction perpendicular to a cross-sectional surface.

The lens panel 530 is disposed over the display panel 520 and selectively refracts or transmits a light emitted from the display panel 520. The lens panel 530 includes first and second substrates 540 and 550 facing and spaced apart from each other and a liquid crystal layer 560 between the first and second substrates 540 and 550. The first and second substrates 540 and 550 may include a flexible material such as plastic. First and second electrodes 542 and 552 are formed on inner surfaces of the first and second substrates 540 and 550, respectively, and a transparent convex lens layer 544 is formed on the first electrode 542.

The first and second electrodes 542 and 552 may have a plate shape corresponding to an entire surface of the first and second substrates 540 and 550. In addition, the first and second electrodes 542 and 552 may be formed of a transparent conductive material such as ITO, IZO, conductive polymer, CNT, graphene and AgNW.

The convex lens layer 544 may include a material having a refractive index substantially the same as an average ($AVG(n_o, n_e, n_{bp})$) of an ordinary refractive index ($n_o$) of a liquid crystal molecule 564, an extraordinary refractive index ($n_e$) of a liquid crystal molecule 564 and a refractive index ($n_{bp}$) of a binder polymer within a range which does not influence on control of a light path. For example, the convex lens layer 544 may include a resin such as PET.

An uneven pattern may be formed on each of the inner surface of the first substrate 540, the first electrode 542, the inner surface of the second substrate 550 and the second electrode 552 for inducing a re-alignment of the liquid crystal molecules 564 when an electric field is applied. The uneven pattern along a direction perpendicular to the cross-sectional surface may include a protrusion part and a concave part parallel to and alternating each other.

The convex lens layer 544 may have a plurality of convex portions on a top surface thereof and each of the plurality of convex portions may have a half-cylindrical shape or half-elliptic-cylindrical shape. The liquid crystal layer 560 is disposed between the convex lens layer 544 and the second electrode 552. Since each of the plurality of convex portions has a cross-section of a half-circular shape or a half-elliptical shape, each of the plurality of convex portions may constitute a spherical convex lens shape or an aspherical convex lens shape.

The liquid crystal layer 560 may include a nano liquid crystal which includes a plurality of nano capsules 562 of a polymer each having a diameter of about 1 nanometer to about 999 nanometers, and each of the plurality of nano capsules 562 may be filled with a plurality of liquid crystal molecules 564. The plurality of liquid crystal molecules 564 may have a negative type having a negative dielectric anisotropy ($\Delta\varepsilon<0$). In addition, the plurality of liquid crystal molecules 564 may have a birefringence property which shows an ordinary refractive index ($n_o$) or an extraordinary refractive index ($n_e$) according to a direction of a light. Further, the plurality of liquid crystal molecules 564 may have a nematic liquid crystal where an ordinary refractive index ($n_o$) is smaller than an extraordinary refractive index ($n_e$)($n_o<n_e$).

The nano liquid crystal may have an isotropy when an electric field is not applied, and the nano liquid crystal may have an anisotropy due to re-alignment in the nano capsule 562 when an electric field is applied.

Specifically, the nano liquid crystal may be formed as a film type by adding a binder polymer. For example, the first electrode 542 and the convex lens layer 544 may be sequentially formed on the first substrate 540 of a film and a nano liquid crystal having the binder polymer may be coated on the convex lens layer 544. Next, the liquid crystal layer 560 may be formed on the convex lens layer 544 by curing the coated nano liquid crystal with a heat or a light. Next, an adhesive layer of a transparent material such as an optically clear adhesive (OCA) may be formed on the liquid crystal layer 560 and a protection film may be formed on the adhesive layer. As a result, the first substrate 540 having the first electrode 542, the convex lens layer 544 and the liquid crystal layer 560 may be used as a film type.

After the protection film may be removed from the first substrate 540 having the first electrode 542, the convex lens layer 544 and the liquid crystal layer 560, the first substrate 540 having the first electrode 542, the convex lens layer 544 and the liquid crystal layer 560 may be attached to the second substrate 550 of a film having the second electrode 552. As a result, the lens panel 530 may be formed as a film type.

The switchable type display device 510 selectively displays a 2D image or a 3D image according to an alignment state of the liquid crystal layer 560.

In a 2D mode where a 2D image is displayed, as shown in FIG. 6A, a voltage is not applied to the first and second electrodes 542 and 552 (OFF) and an electric field is not generated between the first and second electrodes 542 and 552. As a result, the plurality of liquid crystal molecules 564 of the liquid crystal layer 560 are randomly aligned in each nano capsule 562.

The light from the display panel 520 having a polarized state of a direction perpendicular to a cross-sectional surface feels that the plurality of liquid crystal molecules 564 have a refractive index corresponding to an average (AVG($n_o$, $n_e$)) of an ordinary refractive index ($n_o$) and an extraordinary refractive index ($n_e$). As a result, the light is applied to the liquid crystal layer 560 having a refractive index corresponding to an average (AVG($n_o$, $n_e$, $n_{bp}$)) of an ordinary refractive index ($n_o$) of a liquid crystal molecule 564, an extraordinary refractive index ($n_e$) of a liquid crystal molecule 564 and a refractive index ($n_{bp}$) of a binder polymer.

Since the convex lens layer 544 is formed of a material having a refractive index substantially the same as an average (AVG($n_o$, $n_e$, $n_{bp}$)) of an ordinary refractive index ($n_o$), an extraordinary refractive index ($n_e$) and a refractive index ($n_{bp}$) of a binder polymer within a range which does not influence control of a light path, the light from the display panel 520 may not be subject to a difference in refractive index at an interface between the convex lens layer 544 and the liquid crystal layer 460. For example, the refractive index of the convex lens layer 544 may be within a range of about 1.55 to about 1.6, and the average (AVG($n_o$, $n_e$, $n_{bp}$)) of the ordinary refractive index ($n_o$), the extraordinary refractive index ($n_e$) and the refractive index ($n_{bp}$) of a binder polymer may be within a range of about 1.55 to about 1.6.

Accordingly, the light having the polarized state of a direction perpendicular to the cross-sectional surface intactly passes through the lens panel 530 without refraction and the switchable type display device 510 displays a 2D image.

In a 3D mode where a 3D image is displayed, as shown in FIG. 6B, a voltage is applied to the first and second electrodes 542 and 552 (ON) and a vertical electric field E is generated between the first and second electrodes 542 and 552. As a result, the plurality of liquid crystal molecules 564 of a negative type of the liquid crystal layer 560 are re-aligned in each nano capsule 562 such that a long axis of each liquid crystal molecule 564 is perpendicular to a direction of the vertical electric field E. The long axis of each liquid crystal molecule 564 may be parallel to the first and second substrates 540 and 550 and parallel to the cross-sectional surface.

The light from the display panel 520 having a polarized state of a direction parallel to a cross-sectional surface is subject to the plurality of liquid crystal molecules 564 having an ordinary refractive index ($n_o$). As a result, the light is applied to the liquid crystal layer 560 having a refractive index corresponding to an average (AVG($n_o$, $n_{bp}$)) of an ordinary refractive index ($n_o$) of a liquid crystal molecule 564 and a refractive index ($n_{bp}$) of a binder polymer.

Since the convex lens layer 544 is formed of a material having a refractive index substantially the same as an average (AVG($n_o$, $n_e$, $n_{bp}$)) of an ordinary refractive index ($n_o$), an extraordinary refractive index ($n_e$) and a refractive index ($n_{bp}$) of a binder polymer within a range which does not influence control of a light path, the light from the display panel 520 may be subject to a difference in refractive index at an interface between the concave lens layer 544 and the liquid crystal layer 560. For example, since the plurality of liquid crystal molecules 564 may have a nematic liquid crystal where an ordinary refractive index ($n_o$) is smaller than an extraordinary refractive index ($n_e$)($n_o$<$n_e$), the average (AVG($n_o$, $n_{bp}$)) of the ordinary refractive index ($n_o$) and the refractive index ($n_{bp}$) of a binder polymer may be within a range of about 1.45 to about 1.5 smaller than a range of about 1.55 to about 1.6 of the average (AVG($n_o$, $n_e$, $n_{bp}$)) of the ordinary refractive index ($n_o$), the extraordinary refractive index ($n_e$) and the refractive index ($n_{bp}$) of a binder polymer for the convex lens layer 544.

Since the refractive index of the convex lens layer 544 is greater than the refractive index of the liquid crystal layer 560, the lens panel 530 functions as a convex lens and the light from the display panel 520 having the polarized state of a direction perpendicular to a cross-sectional surface is refracted while passing through the lens panel 530. Accordingly, the switchable type display device 510 displays a 3D image.

Since the switchable type display device 510 uses the nano liquid crystal where each nano capsule 562 is filled with the liquid crystal molecules 564, the switchable type display device 510 may be fabricated using the lens panel 530 of a film type. In addition, fabrication cost is reduced by omitting an orientation film and a planarization film. Further, since the liquid crystal molecules 564 are re-aligned according to the electric field, a uniform alignment property is obtained.

Although the 2D image is displayed without application of the voltage and the 3D image is displayed with application of the voltage using a light having a polarized state of a direction perpendicular to the cross-sectional surface in the fifth embodiment, a 2D image may be displayed with application of the voltage and a 3D image may be displayed without application of the voltage by adjusting the ordinary refractive index ($n_o$) and the extraordinary refractive index ($n_e$) of a liquid crystal molecule and the refractive index of the convex lens layer and using a light having a polarized state of a direction parallel to a cross-sectional surface in another embodiment.

Although a 2D image or a 3D image is selectively displayed using a polarized light in the first to fifth embodiments, a 2D image or a 3D image may be selectively displayed using an unpolarized light in another embodiment.

Figure 7A:
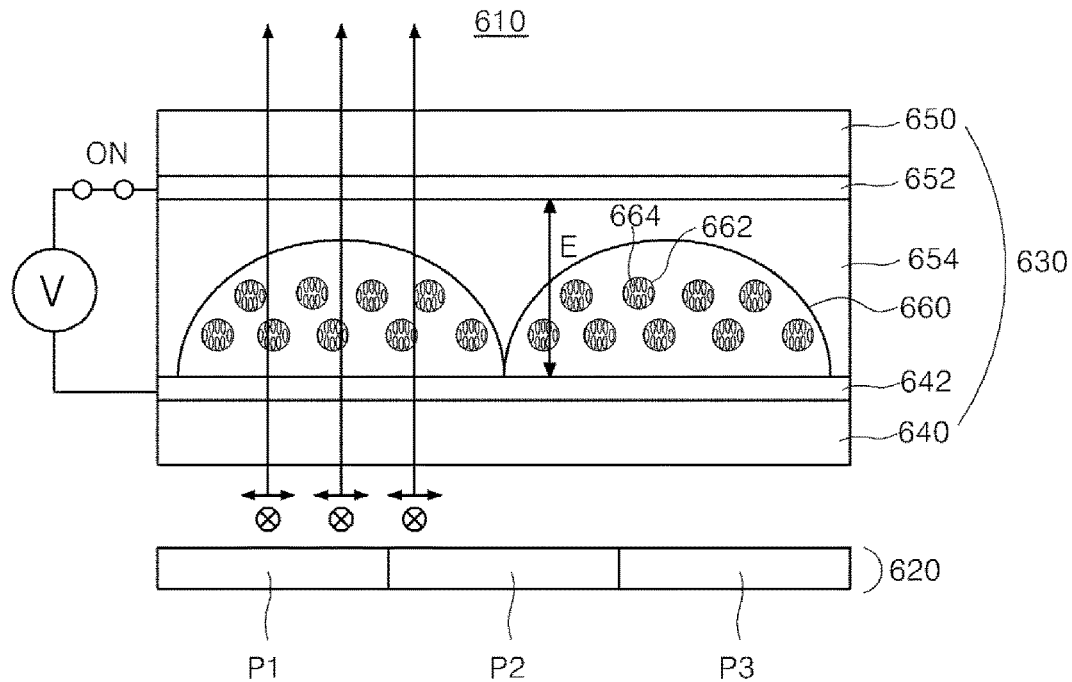
FIGS. 7A and 7B are cross-sectional views showing a light path of a switchable type display device in a 2D mode and a 3D mode, respectively, according to a sixth embodiment of the present disclosure.
Figure 7B:
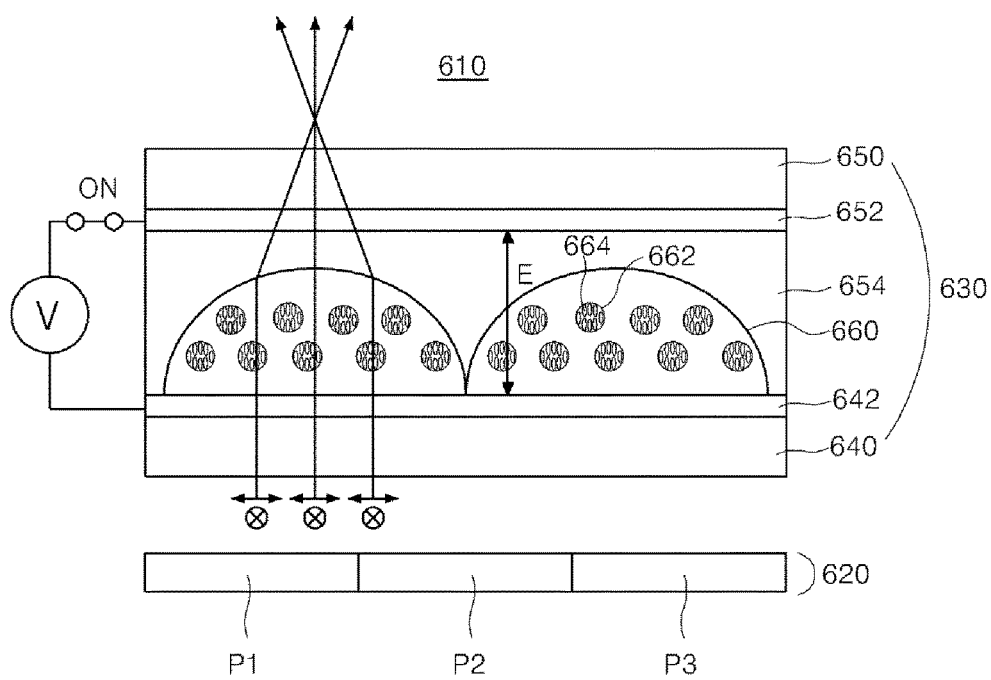

FIGS. 7A and 7B are cross-sectional views showing a light path of a switchable type display device in a 2D mode and a 3D mode, respectively, according to a sixth embodiment of the present invention. An illustration for parts of the second embodiment having the same structure as the first embodiment will be omitted.

In FIGS. 7A and 7B, a switchable type display device 610 according to a sixth embodiment of the present disclosure includes a display panel 620 and a lens panel 630. The display panel 620 displays a 2D image or a 3D image using a plurality of pixels including first to third pixels P1 to P3.

For example, the display panel 620 may be a FPD such as an LCD, an OLED and a PDP. The LCD may have one of a TN mode, an IPS mode, a VA mode, an ECB mode and an OCB mode.

The light emitted from the display panel 620 may have a non-polarized state as well as a polarized state along a predetermined direction. For example, the display panel 620 may be a top emission type OLED where a linear polarizing plate and a quarter wave plate for preventing reflection of an ambient light are removed. Since the switchable type display device 610 uses an effective refractive index of a liquid crystal layer 660 instead of a birefringence (phase difference) of the liquid crystal layer 660, the switchable type display active 610 may selectively display a 2D image or a 3D image even when the display panel 620 emits an unpolarized light.

The lens panel 630 is disposed over the display panel 620 and selectively refracts or transmits a light emitted from the display panel 620. The lens panel 630 includes first and second substrates 640 and 650 facing and spaced apart from each other and a liquid crystal layer 660 between the first and second substrates 640 and 650. The first and second substrates 640 and 650 may include a flexible material such as plastic. First and second electrodes 642 and 652 are formed on inner surfaces of the first and second substrates 640 and 650, respectively, and a transparent concave lens layer 654 is formed on the second electrode 652.

The first and second electrodes 642 and 652 may have a plate shape corresponding to an entire surface of the first and second substrates 640 and 650. In addition, the first and second electrodes 642 and 652 may be formed of a transparent conductive material such as ITO, IZO, conductive polymer, CNT, graphene and AgNW.

The concave lens layer 654 may include a material having a refractive index substantially the same as an average (AVG($n_o$, $n_e$, $n_{bp}$)) of an ordinary refractive index ($n_o$) of a liquid crystal molecule 664, an extraordinary refractive index ($n_e$) of a liquid crystal molecule 664 and a refractive index ($n_{bp}$) of a binder polymer within a range which does not influence control of a light path. For example, the concave lens layer 654 may include a resin such as PET.

The concave lens layer 654 may have a plurality of concave portions on a bottom surface thereof and each of the plurality of concave portions may have a half-cylindrical shape or half-elliptic-cylindrical shape. The liquid crystal layer 660 is disposed in the plurality of concave portions between the concave lens layer 654 and the first electrodes 642. Since each of the plurality of concave portions has a cross-section of a half-circular shape or a half-elliptical shape, each of the plurality of concave portions may constitute a spherical concave lens shape or an aspherical concave lens shape.

The liquid crystal layer 660 may include a nano liquid crystal which includes a plurality of nano capsules 662 of a polymer each having a diameter of about 1 nanometer to about 999 nanometers, and each of the plurality of nano capsules 662 may be filled with a plurality of liquid crystal molecules 664. The plurality of liquid crystal molecules 664 may have a negative type having a positive dielectric anisotropy ($\Delta \in > 0$). In addition, the plurality of liquid crystal molecules 664 may have a birefringence property which shows an ordinary refractive index ($n_o$) or an extraordinary refractive index ($n_e$) according to a direction of a light. Further, the plurality of liquid crystal molecules 664 may have a nematic liquid crystal where an ordinary refractive index ($n_o$) is smaller than an extraordinary refractive index ($n_e$)($n_o < n_e$).

The nano liquid crystal may have an isotropy when an electric field is not applied, and the nano liquid crystal may have an anisotropy due to re-alignment in the nano capsule 662 when an electric field is applied. Specifically, the nano liquid crystal may be formed as a film type by adding a binder polymer.

The switchable type display device 610 selectively displays a 2D image or a 3D image according to an alignment state of the liquid crystal layer 660.

In a 2D mode where a 2D image is displayed, as shown in FIG. 7A, a voltage is applied to the first and second electrodes 642 and 652 (ON) and a vertical electric field E is generated between the first and second electrodes 642 and 652. As a result, the plurality of liquid crystal molecules 664 of a positive type of the liquid crystal layer 660 are re-aligned in each nano capsule 662 such that a long axis of each liquid crystal molecule 664 is parallel to a direction of the vertical electric field E. The long axis of each liquid crystal molecule 664 may be perpendicular to the first and second substrates 640 and 650 and parallel to the cross-sectional surface.

The light from the display panel 620 having a polarized state or a non-polarized state feels that the plurality of liquid crystal molecules 664 an ordinary refractive index ($n_o$). As a result, the light feels that the liquid crystal layer 660 has a refractive index corresponding to an average (AVG($n_o$, $n_{bp}$)) of an ordinary refractive index ($n_o$) of a liquid crystal molecule 664 and a refractive index ($n_{bp}$) of a binder polymer.

Since the concave lens layer 654 is formed of a material having a refractive index substantially the same as an average (AVG($n_o$, $n_{bp}$)) of an ordinary refractive index ($n_o$) and a refractive index ($n_{bp}$) of a binder polymer within a range which does not influence on control of a light path, the light from the display panel 620 may not be subject to a difference in refractive index at an interface between the liquid crystal layer 660 and the concave lens layer 654. For example, the average (AVG($n_o$, $n_{bp}$)) of the ordinary refractive index ($n_o$) and the refractive index ($n_{bp}$) of a binder polymer may be within a range of about 1.45 to about 1.5, and the refractive index of the concave lens layer 654 may be within a range of about 1.45 to about 1.5.

Accordingly, the light having a polarized state or a non-polarized state intactly passes through the lens panel 630 without refraction and the switchable type display device 610 displays a 2D image.

In a 3D mode where a 3D image is displayed, as shown in FIG. 7B, a voltage is not applied to the first and second electrodes 642 and 652 (OFF) and an electric field is not generated between the first and second electrodes 642 and 652. As a result, the plurality of liquid crystal molecules 664 of the liquid crystal layer 660 are randomly aligned in each nano capsule 662.

The light from the display panel 620 having a polarized state or a non-polarized state feels that the plurality of liquid crystal molecules 664 have a refractive index corresponding to an average (AVG($n_o$, $n_e$)) of an ordinary refractive index ($n_o$) and an extraordinary refractive index ($n_e$). As a result, the light is applied to the liquid crystal layer 660 having a refractive index corresponding to an average (AVG($n_o$, $n_e$, $n_{bp}$)) of an ordinary refractive index ($n_o$) of a liquid crystal molecule 664, an extraordinary refractive index ($n_e$) of a liquid crystal molecule 664 and a refractive index ($n_{bp}$) of a binder polymer.

Since the concave lens layer 654 is formed of a material having a refractive index substantially the same as an average (AVG($n_o$, $n_{bp}$)) of an ordinary refractive index ($n_o$)

and a refractive index ($n_{bp}$) of a binder polymer within a range which does not influence on control of a light path, the light from the display panel 620 may be subject to a difference in refractive index at an interface between the liquid crystal layer 660 and the concave lens layer 654. For example, since the plurality of liquid crystal molecules 664 may have a nematic liquid crystal where an ordinary refractive index ($n_o$) is smaller than an extraordinary refractive index ($n_e$)($n_o < n_e$), the average (AVG($n_o$, $n_e$, $n_{bp}$)) of the ordinary refractive index ($n_o$), the extraordinary refractive index ($n_e$) and the refractive index ($n_{bp}$) of a binder polymer may be within a range of about 1.55 to about 1.6 greater than a range of about 1.45 to about 1.5 of the average (AVG($n_o$, $n_{bp}$)) of the ordinary refractive index ($n_o$) and the refractive index ($n_{bp}$) of a binder polymer for the concave lens layer 654.

Since the refractive index of the liquid crystal layer 660 is greater than the refractive index of the concave lens layer 654, the lens panel 630 functions as a convex lens and the light from the display panel 620 having a polarized state or a non-polarized state is refracted while passing through the lens panel 630. Accordingly, the switchable type display device 610 displays a 3D image.

Since the switchable type display device 610 uses the nano liquid crystal where each nano capsule 662 is filled with the liquid crystal molecules 664, the switchable type display device 610 may be fabricated using the lens panel 630 of a film type. In addition, fabrication cost is reduced by omitting an orientation film and a planarization film. Further, since the liquid crystal molecules 664 are re-aligned according to the electric field, a uniform alignment property is obtained.

Although the liquid crystal layer is formed between the first substrate and the concave lens layer of the second substrate in the sixth embodiment, the liquid crystal layer may be formed between the convex lens layer of the first substrate and the second substrate in another embodiment.

Figure 8A:
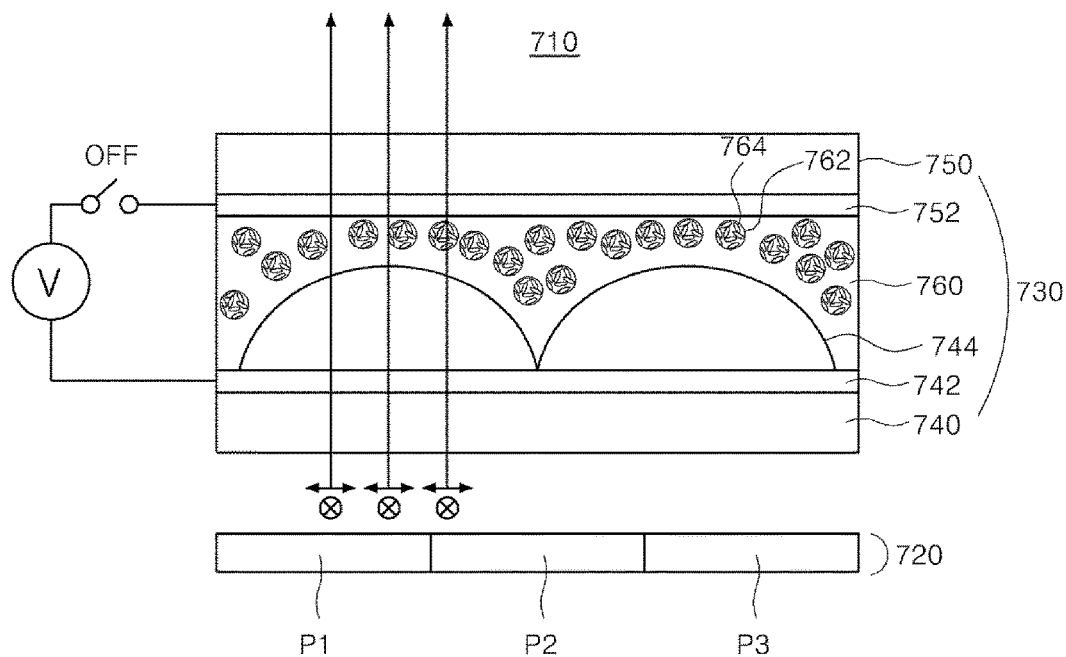
FIGS. 8A and 8B are cross-sectional views showing a light path of a switchable type display device in a 2D mode and a 3D mode, respectively, according to a seventh embodiment of the present disclosure.
Figure 8B:
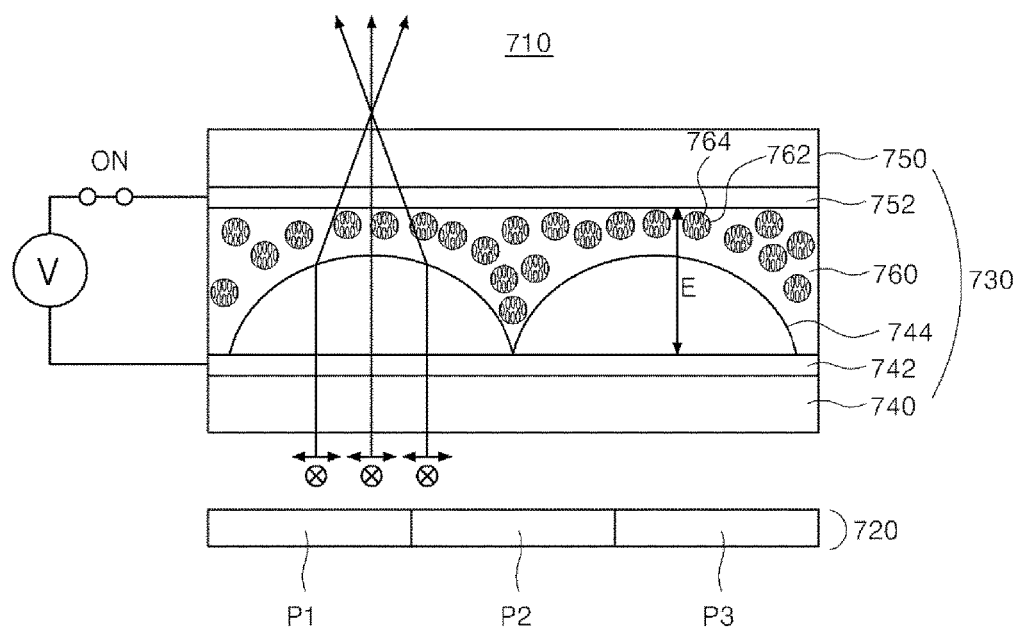

FIGS. 8A and 8B are cross-sectional views showing a light path of a switchable type display device in a 2D mode and a 3D mode, respectively, according to a seventh embodiment of the present disclosure. An illustration for parts of the second embodiment having the same structure as the first embodiment will be omitted.

In FIGS. 8A and 8B, a switchable type display device 710 according to a seventh embodiment of the present disclosure includes a display panel 720 and a lens panel 730. The display panel 720 displays a 2D image or a 3D image using a plurality of pixels including first to third pixels P1 to P3. For example, the display panel 720 may be a FPD such as an LCD, an OLED and a PDP. The LCD may have one of a TN mode, an IPS mode, a VA mode, an ECB mode and an OCB mode.

The light emitted from the display panel 720 may have a non-polarized state as well as a polarized state along a predetermined direction. For example, the display panel 720 may be a top emission type OLED where a linear polarizing plate and a quarter wave plate for preventing reflection of an ambient light are removed. Since the switchable type display device 710 uses an effective refractive index of a liquid crystal layer 760 instead of a birefringence (phase difference) of the liquid crystal layer 760, the switchable type display active 710 may selectively display a 2D image or a 3D image even when the display panel 720 emits an unpolarized light.

The lens panel 730 is disposed over the display panel 720 and selectively refracts or transmits a light emitted from the display panel 720. The lens panel 730 includes first and second substrates 740 and 750 facing and spaced apart from each other and a liquid crystal layer 760 between the first and second substrates 740 and 750. The first and second substrates 740 and 750 may include a flexible material such as plastic. First and second electrodes 742 and 752 are formed on inner surfaces of the first and second substrates 740 and 750, respectively, and a transparent convex lens layer 744 is formed on the first electrode 742.

The first and second electrodes 742 and 752 may have a plate shape corresponding to an entire surface of the first and second substrates 740 and 750. In addition, the first and second electrodes 742 and 752 may be formed of a transparent conductive material such as ITO, IZO, conductive polymer, CNT, graphene and AgNW.

The convex lens layer 744 may include a material having a refractive index substantially the same as an average (AVG($n_o$, $n_e$, $n_{bp}$)) of an ordinary refractive index ($n_o$) of a liquid crystal molecule 764, an extraordinary refractive index ($n_e$) of a liquid crystal molecule 764 and a refractive index ($n_{bp}$) of a binder polymer within a range which does not influence control of a light path. For example, the convex lens layer 744 may include a resin such as PET.

The convex lens layer 744 may have a plurality of convex portions on a top surface thereof and each of the plurality of convex portions may have a half-cylindrical shape or half-elliptic-cylindrical shape. The liquid crystal layer 760 is disposed between the convex lens layer 744 and the second electrode 752. Since each of the plurality of convex portions has a cross-section of a half-circular shape or a half-elliptical shape, each of the plurality of convex portions may constitute a spherical convex lens shape or an aspherical convex lens shape.

The liquid crystal layer 760 may include a nano liquid crystal which includes a plurality of nano capsules 762 of a polymer each having a diameter of about 1 nanometer to about 999 nanometers, and each of the plurality of nano capsules 762 may be filled with a plurality of liquid crystal molecules 764. The plurality of liquid crystal molecules 764 may have a negative type having a positive dielectric anisotropy ($\Delta\epsilon > 0$). In addition, the plurality of liquid crystal molecules 764 may have a birefringence property which shows an ordinary refractive index ($n_o$) or an extraordinary refractive index ($n_e$) according to a direction of a light. Further, the plurality of liquid crystal molecules 764 may have a nematic liquid crystal where an ordinary refractive index ($n_o$) is smaller than an extraordinary refractive index ($n_e$)($n_o < n_e$).

The nano liquid crystal may have an isotropy when an electric field is not applied, and the nano liquid crystal may have an anisotropy due to re-alignment in the nano capsule 762 when an electric field is applied. Specifically, the nano liquid crystal may be formed as a film type by adding a binder polymer.

The switchable type display device 710 selectively displays a 2D image or a 3D image according to an alignment state of the liquid crystal layer 760.

In a 2D mode where a 2D image is displayed, as shown in FIG. 8A, a voltage is not applied to the first and second electrodes 742 and 752 (OFF) and an electric field is not generated between the first and second electrodes 742 and 752. As a result, the plurality of liquid crystal molecules 764 of the liquid crystal layer 760 are randomly aligned in each nano capsule 762.

The light from the display panel 720 having a polarized state or a non-polarized state feels that the plurality of liquid crystal molecules 664 have a refractive index corresponding to an average (AVG($n_o$, $n_e$)) of an ordinary refractive index ($n_o$) and an extraordinary refractive index ($n_e$). As a result, the light is applied to the liquid crystal layer 760 having a refractive index corresponding to an average (AVG($n_o$, $n_e$, $n_{bp}$)) of an ordinary refractive index ($n_o$) of a liquid crystal molecule 764, an extraordinary refractive index ($n_e$) of a liquid crystal molecule 764 and a refractive index ($n_{bp}$) of a binder polymer.

Since the convex lens layer 744 is formed of a material having a refractive index substantially the same as an average (AVG($n_o$, $n_e$, $n_{bp}$)) of an ordinary refractive index ($n_o$), an extraordinary refractive index ($n_e$) and a refractive index ($n_{bp}$) of a binder polymer within a range which does not influence on control of a light path, the light from the display panel 720 may not be subject to a difference in refractive index at an interface between the convex lens layer 744 and the liquid crystal layer 760. For example, the refractive index of the convex lens layer 744 may be within a range of about 1.55 to about 1.6, and the average (AVG($n_o$, $n_e$, $n_{bp}$)) of the ordinary refractive index ($n_o$), the extraordinary refractive index ($n_e$) and the refractive index ($n_{bp}$) of a binder polymer may be within a range of about 1.55 to about 1.6.

Accordingly, the light having a polarized state or a non-polarized state intactly passes through the lens panel 730 without refraction and the switchable type display device 710 displays a 2D image.

In a 3D mode where a 3D image is displayed, as shown in FIG. 8B, a voltage is applied to the first and second electrodes 742 and 752 (ON) and a vertical electric field E is generated between the first and second electrodes 742 and 752. As a result, the plurality of liquid crystal molecules 764 of a positive type of the liquid crystal layer 760 are re-aligned in each nano capsule 762 such that a long axis of each liquid crystal molecule 764 is parallel to a direction of the vertical electric field E. The long axis of each liquid crystal molecule 764 may be perpendicular to the first and second substrates 740 and 750 and parallel to the cross-sectional surface.

The light from the display panel 720 having a polarized state or a non-polarized state feels that the plurality of liquid crystal molecules 764 have an ordinary refractive index ($n_o$). As a result, the light is applied to the liquid crystal layer 760 having a refractive index corresponding to an average (AVG ($n_o$, $n_{bp}$)) of an ordinary refractive index ($n_o$) of a liquid crystal molecule 764 and a refractive index ($n_{bp}$) of a binder polymer.

Since the convex lens layer 744 is formed of a material having a refractive index substantially the same as an average (AVG($n_o$, $n_e$, $n_{bp}$)) of an ordinary refractive index ($n_o$), an extraordinary refractive index ($n_e$) and a refractive index ($n_{bp}$) of a binder polymer within a range which does not influence control of a light path, the light from the display panel 720 may be subject to a difference in refractive index at an interface between the concave lens layer 744 and the liquid crystal layer 760. For example, since the plurality of liquid crystal molecules 764 may have a nematic liquid crystal where an ordinary refractive index ($n_o$) is smaller than an extraordinary refractive index ($n_e$)($n_o$<$n_e$), the average (AVG($n_o$, $n_{bp}$)) of the ordinary refractive index ($n_o$) and the refractive index ($n_{bp}$) of a binder polymer may be within a range of about 1.45 to about 1.5 smaller than a range of about 1.55 to about 1.6 of the average (AVG($n_o$, $n_e$, $n_{bp}$)) of the ordinary refractive index ($n_o$), the extraordinary refractive index ($n_e$) and the refractive index ($n_{bp}$) of a binder polymer for the convex lens layer 744.

Since the refractive index of the convex lens layer 744 is greater than the refractive index of the liquid crystal layer 760, the lens panel 730 functions as a convex lens and the light from the display panel 720 having a polarized state or a non-polarized state is refracted while passing through the lens panel 730. Accordingly, the switchable type display device 710 displays a 3D image.

Since the switchable type display device 710 uses the nano liquid crystal where each nano capsule 762 is filled with the liquid crystal molecules 764, the switchable type display device 710 may be fabricated using the lens panel 730 of a film type. In addition, fabrication cost is reduced by omitting an orientation film and a planarization film. Further, since the liquid crystal molecules 764 are re-aligned according to the electric field, a uniform alignment property is obtained.

Although the 2D image is displayed without application of the voltage and the 3D image is displayed with application of the voltage in the seventh embodiment, the 2D image may be displayed with application of the voltage and the 3D image may be displayed without application of the voltage by adjusting the ordinary refractive index ($n_o$) and the extraordinary refractive index ($n_e$) of the liquid crystal molecule 764 and the refractive index of the convex lens layer 744 in another embodiment.

For preventing charge accumulation in the liquid crystal layer, the lens panel may be driven with an inversion method.

Figure 9A:
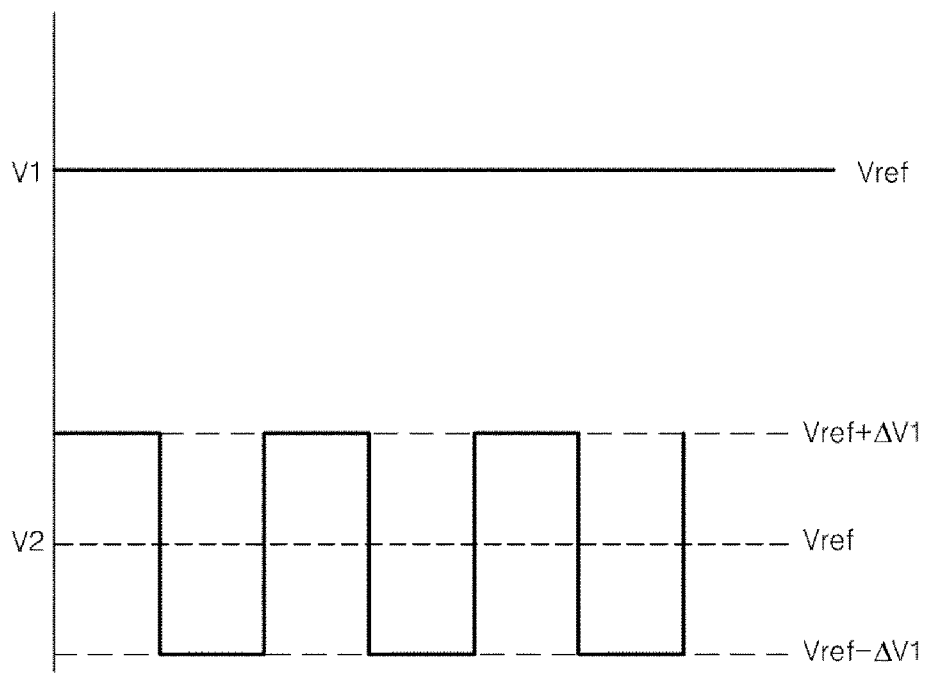
FIGS. 9A and 9B are views showing a voltage supplied to a switchable type display device according to eighth and ninth embodiments, respectively, of the present disclosure.
Figure 9B:
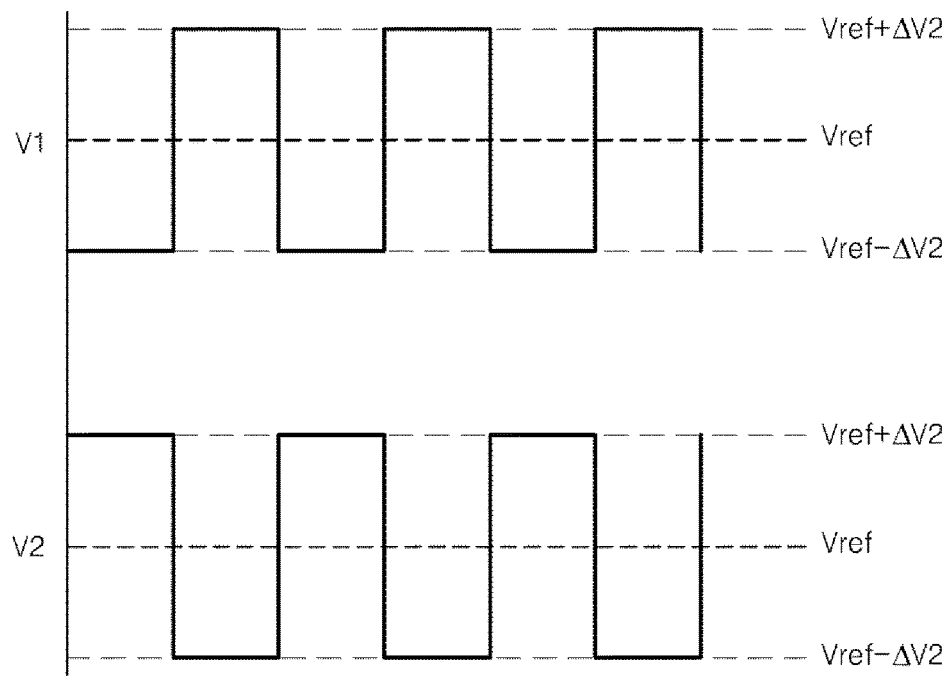

FIGS. 9A and 9B are views showing a voltage supplied to a switchable type display device according to eighth and ninth embodiments, respectively, of the present disclosure. The voltage of FIGS. 9A and 9B may be supplied to the switchable type display device according to one of the first to seventh embodiments, and the switchable display device according to the first embodiment may be illustrated as an exemplary embodiment.

In FIG. 9A, when the switchable type display device 110 displays a 3D image, first and second voltages V1 and V2 are applied to the first and second electrodes 142 and 144, respectively, to generate an electric field. The first voltage V1 may have a reference voltage Vref, and the second voltage V2 may alternately have a first value (Vref+ΔV1) greater than the reference voltage Vref by a first voltage difference ΔV1 and a second value (Vref−ΔV1) smaller than the reference voltage Vref by the first voltage difference ΔV1.

As a result, the first and second voltage V1 and V2 of the first and second electrodes 142 and 144 have the first voltage difference ΔV1, and an electric field by the first voltage difference ΔV1 is applied to the liquid crystal layer 160 so that the liquid crystal molecules 164 can be re-aligned in the nano capsule 162 by the electric field. Since the polarity of the second voltage V2 periodically changes with respect to the reference voltage Vref, a direction of the electric field also periodically changes. Accordingly, accumulation of charges in the liquid crystal layer 160 is prevented.

In FIG. 9B, when the switchable type display device 110 displays a 3D image, first and second voltages V1 and V2 are applied to the first and second electrodes 142 and 144, respectively, to generate an electric field. The first voltage V1 may alternately have a third value (Vref−ΔV2) smaller than a reference voltage Vref by a second voltage difference ΔV2 and a fourth value (Vref+ΔV2) greater than the reference voltage Vref by the second voltage difference ΔV2, and the second voltage may alternately have the fourth value (Vref+ΔV2) greater than the reference voltage Vref by the second voltage difference ΔV2 and the third value (Vref−ΔV2) smaller than the reference voltage Vref by the second voltage difference ΔV2.

The first and second voltages V1 and V2 may have opposite polarities with respect to the reference voltage. For example, when the first voltage V1 has the third value (Vref−ΔV2) smaller than the reference voltage Vref by the second voltage difference ΔV2, the second voltage V2 may have the fourth value (Vref+ΔV2) greater than the reference voltage Vref by the second voltage difference ΔV2. In addition, when the first voltage V1 has the fourth value (Vref+ΔV2) greater than the reference voltage Vref by the second voltage difference ΔV2, the second voltage V2 may have the third value (Vref−ΔV2) smaller than the reference voltage Vref by the second voltage difference ΔV2.

As a result, the first and second voltage V1 and V2 of the first and second electrodes 142 and 144 have twice (2ΔV2) of the second voltage difference ΔV2, and an electric field by twice (2ΔV2) of the second voltage difference ΔV2 is applied to the liquid crystal layer 160 so that the liquid crystal molecules 164 can be re-aligned in the nano capsule 162 by the electric field. Since the polarity of the first and second voltages V1 and V2 periodically change with respect to the reference voltage Vref, a direction of the electric field also periodically changes. Accordingly, accumulation of charges in the liquid crystal layer 160 is prevented.

In addition, since the first and second voltages V1 and V2 have twice (2ΔV2) of the second voltage difference ΔV2, the electric field of FIG. 9B may have the same intensity as the electric field of FIG. 9A even when the second voltage difference ΔV2 is determined as a half of the first voltage difference ΔV1. Accordingly, an amplitude of each of the first and second voltages V1 and V2 of FIG. 9B may be reduced as compared an amplitude of the second voltage V2 of FIG. 9A so that power consumption can be further reduced.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A switchable type display device comprising:
a display panel displaying an image; and
a lens panel refracting or transmitting a light emitted from the display panel, the lens panel comprising:
first and second substrates facing and spaced apart from each other;
first and second electrodes on an inner surface of at least one of the first and second substrates;
a lens layer between the first and second substrates; and
a liquid crystal layer between the lens layer and one of the first and second substrates, the liquid crystal layer including a nano liquid crystal having a plurality of nano capsules each filled with a plurality of liquid crystal molecules and a binder polymer,
wherein the lens layer has a refractive index that is substantially the same as an average of an ordinary refractive index of the plurality of liquid crystal molecules, an extraordinary refractive index of the plurality of liquid crystal molecules, and a refractive index of the binder polymer.

2. A switchable type display device comprising:
a display panel displaying an image; and
a lens panel refracting or transmitting a light emitted from the display panel, the lens panel comprising:
first and second substrates facing and spaced apart from each other;
first and second electrodes on an inner surface of at least one of the first and second substrates;
a lens layer between the first and second substrates; and
a liquid crystal layer between the lens layer and one of the first and second substrates, the liquid crystal layer including a nano liquid crystal having a plurality of nano capsules each filled with a plurality of liquid crystal molecules and a binder polymer,
wherein the plurality of liquid crystal molecules are a nematic liquid crystal having an ordinary refractive index smaller than an extraordinary refractive index, wherein the nano liquid crystal has an isotropy without application of an electric field and has an anisotropy with application of the electric field.

3. The display device of claim 2, wherein the lens layer includes a concave lens layer having a plurality of concave portions on a bottom surface thereof, wherein each of the plurality of concave portions has one of a half-cylindrical shape and half-elliptic-cylindrical shape, wherein the plurality of concave portions are spaced apart from and parallel to each other, and wherein the concave lens layer is disposed on the inner surface of the second substrate.

4. The display device of claim 3, wherein the first and second electrodes are alternately disposed on the inner surface of the first substrate, wherein each of the first and second electrodes has a bar shape, and wherein the first and second electrodes are spaced apart from and parallel to each other.

5. The display device of claim 4, wherein the plurality of liquid crystal molecules has a positive dielectric anisotropy.

6. The display device of claim 3, wherein the first and second electrodes are disposed on the inner surfaces of the first and second substrates, respectively, and wherein each of the first and second electrodes has a plate shape.

7. The display device of claim 6, wherein the concave lens layer has a refractive index substantially a same as an average of the ordinary refractive index, the extraordinary refractive index and a refractive index of the binder polymer, and wherein the plurality of liquid crystal molecules has a negative dielectric anisotropy.

8. The display device of claim 6, wherein the concave lens layer has a refractive index substantially a same as an average of the ordinary refractive index and a refractive index of the binder polymer, and wherein the plurality of liquid crystal molecules has a positive dielectric anisotropy.

9. The display device of claim 8, wherein the display panel emits the light having a non-polarized state.

10. The display device of claim 2, wherein the lens layer includes a convex lens layer having a plurality of convex portions on a top surface thereof, wherein each of the plurality of convex portions has one of a half-cylindrical shape and half-elliptic-cylindrical shape, wherein the plurality of convex portions are spaced apart from and parallel to each other, and wherein the convex lens layer is disposed on the inner surface of the first substrate.

11. The display device of claim 10, wherein the first and second electrodes are alternately disposed on the inner surface of the second substrate, wherein each of the first and second electrodes has a bar shape, and wherein the first and second electrodes are spaced apart from and parallel to each other.

12. The display device of claim 11, wherein the convex lens layer has a refractive index substantially a same as an average of the extraordinary refractive index and a refractive index of the binder polymer, and wherein the plurality of liquid crystal molecules has a positive dielectric anisotropy.

13. The display device of claim 11, wherein the convex lens layer has a refractive index substantially a same as an average of the ordinary refractive index, the extraordinary refractive index and a refractive index of the binder polymer, and wherein the plurality of liquid crystal molecules has a positive dielectric anisotropy.

14. The display device of claim 10, wherein the first and second electrodes are disposed on the inner surfaces of the first and second substrates, respectively, and wherein each of the first and second electrodes has a plate shape.

15. The display device of claim 14, wherein the convex lens layer has a refractive index substantially a same as an average of the ordinary refractive index, the extraordinary refractive index and a refractive index of the binder polymer, and wherein the plurality of liquid crystal molecules has a negative dielectric anisotropy.

16. The display device of claim 14, wherein the convex lens layer has a refractive index substantially a same as an average of the ordinary refractive index, the extraordinary refractive index and a refractive index of the binder polymer, and wherein the plurality of liquid crystal molecules has a positive dielectric anisotropy.

17. The display device of claim 16, wherein the display panel emits the light having a non-polarized state.

\* \* \* \* \*